(12) United States Patent
Rositch et al.

(10) Patent No.: US 11,813,917 B2
(45) Date of Patent: Nov. 14, 2023

(54) SUSPENSION ELEMENT SYSTEMS AND METHODS

(71) Applicant: Oshkosh Defense, LLC, Oshkosh, WI (US)

(72) Inventors: Aaron Rositch, Oshkosh, WI (US); Erik Ellifson, Oshkosh, WI (US); Patrick Dillman, Hartford, WI (US); Kai Schubart, Oshkosh, WI (US); Robert Sollenskog, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 148 days.

(21) Appl. No.: 17/165,536

(22) Filed: Feb. 2, 2021

(65) Prior Publication Data

US 2021/0155063 A1    May 27, 2021

Related U.S. Application Data

(63) Continuation of application No. 16/859,225, filed on Apr. 27, 2020, now Pat. No. 10,940,728, which is a continuation of application No. 15/956,974, filed on Apr. 19, 2018, now Pat. No. 10,632,805.

(60) Provisional application No. 62/491,971, filed on Apr. 28, 2017, provisional application No. 62/491,132, filed on Apr. 27, 2017.

(51) Int. Cl.
*B60G 3/01*    (2006.01)
*B60G 15/12*    (2006.01)

(52) U.S. Cl.
CPC .............. *B60G 3/01* (2013.01); *B60G 15/12* (2013.01); *B60G 2202/152* (2013.01); *B60G 2202/24* (2013.01); *B60G 2206/82013* (2013.01)

(58) Field of Classification Search
None
See application file for complete search history.

(56) References Cited

U.S. PATENT DOCUMENTS

| | | |
|---|---|---|
| 2,214,038 A | 9/1940 | Beecher |
| 2,653,681 A | 9/1953 | McIntyre |
| 2,783,859 A | 3/1957 | Patriquin |
| 2,985,319 A | 5/1961 | Simmons |
| 3,000,625 A | 9/1961 | Polhemus |
| 3,175,645 A | 3/1965 | Schafer et al. |
| 3,341,189 A | 9/1967 | Rumsey |
| 3,376,957 A | 4/1968 | Baumgartner |

(Continued)

FOREIGN PATENT DOCUMENTS

| | | | |
|---|---|---|---|
| CN | 206953913 U | * 2/2018 | |
| EP | 1158202 A2 | * 11/2001 | ............. F16F 9/348 |
| JP | 63-167137 | 7/1988 | |

*Primary Examiner* — Faye M Fleming
(74) *Attorney, Agent, or Firm* — Foley & Lardner LLP

(57) ABSTRACT

A vehicle includes a support arm and a suspension element. The suspension element is rotatably connected to a support arm of a vehicle via a mounting pin that extends through an opening on the suspension element, a thrust washer, and a seal. The combination of elements prevent debris from migrating into the connection. The suspension element is configured to connect to a structural element of the vehicle via an upper mount. The suspension element may include a recoil damper having a piston with a plurality of grooves arranged to balance the forces on the piston during and after a recoil event or jounce.

11 Claims, 28 Drawing Sheets

(56) References Cited

U.S. PATENT DOCUMENTS

| | | | |
|---|---|---|---|
| 3,439,913 | A | 4/1969 | Kamman |
| 3,446,317 | A | 5/1969 | Gryglas |
| 3,447,644 | A | 6/1969 | Duckett |
| 3,565,498 | A * | 2/1971 | Leopard et al. ...... F16C 17/035 384/306 |
| 3,731,770 | A | 5/1973 | Bindon |
| 3,750,856 | A | 8/1973 | Kenworthy |
| 4,150,819 | A | 4/1979 | Taylor |
| 4,284,177 | A | 8/1981 | Domek |
| 4,383,595 | A | 5/1983 | Schnitzius |
| 4,591,031 | A | 5/1986 | Kirst |
| 4,796,871 | A | 1/1989 | Bauer et al. |
| 4,899,853 | A | 2/1990 | Hummel |
| 5,024,301 | A | 6/1991 | Cook |
| 5,040,645 | A | 8/1991 | Volpel et al. |
| 5,102,109 | A | 4/1992 | Schnetz |
| 5,234,084 | A | 8/1993 | Bell |
| 5,503,258 | A | 4/1996 | Clarke et al. |
| 6,053,486 | A | 4/2000 | Schuitema et al. |
| 6,129,343 | A | 10/2000 | Ecarnot |
| 7,228,948 | B2 | 6/2007 | Wilda et al. |
| 7,703,586 | B2 * | 4/2010 | Deferme ............... F16F 9/5126 188/282.5 |
| 8,205,729 | B2 | 6/2012 | Miyasato et al. |
| 8,333,390 | B2 | 12/2012 | Linsmeier et al. |
| 8,459,619 | B2 | 6/2013 | Trinh et al. |
| 8,465,025 | B2 | 6/2013 | Venton-Walters et al. |
| 8,541,895 | B2 | 9/2013 | Kuriki |
| 8,596,648 | B2 | 12/2013 | Venton-Walters et al. |
| 8,657,498 | B2 * | 2/2014 | Cooley ................ F16C 17/028 384/93 |
| 8,764,029 | B2 | 7/2014 | Venton-Walters et al. |
| 8,801,017 | B2 | 8/2014 | Ellifson et al. |
| 8,821,130 | B2 | 9/2014 | Venton-Walters et al. |
| 8,876,133 | B2 | 11/2014 | Ellifson |
| 8,947,531 | B2 | 2/2015 | Fischer et al. |
| 8,991,834 | B2 | 3/2015 | Venton-Walters et al. |
| 8,991,840 | B2 | 3/2015 | Zuleger et al. |
| 9,045,014 | B1 | 6/2015 | Verhoff et al. |
| 9,127,738 | B2 | 9/2015 | Ellifson et al. |
| 9,145,905 | B2 | 9/2015 | Hou |
| 9,174,686 | B1 | 11/2015 | Messina et al. |
| 9,291,230 | B2 | 3/2016 | Ellifson et al. |
| 9,303,715 | B2 | 4/2016 | Dillman et al. |
| 9,306,432 | B2 * | 4/2016 | Coldwate ................ H02K 9/06 |
| 9,327,576 | B2 | 5/2016 | Ellifson |
| 9,581,153 | B2 | 2/2017 | Venton-Walters et al. |
| 9,656,640 | B1 | 5/2017 | Verhoff et al. |
| 9,669,679 | B2 | 6/2017 | Zuleger et al. |
| 9,688,112 | B2 | 6/2017 | Venton-Walters et al. |
| 9,707,869 | B1 | 7/2017 | Messina et al. |
| 9,764,613 | B2 | 9/2017 | Rowe et al. |
| 9,765,841 | B2 | 9/2017 | Ellifson et al. |
| 9,809,080 | B2 | 11/2017 | Ellifson et al. |
| 9,845,839 | B2 * | 12/2017 | Rummel ................... F16F 9/18 |
| 9,890,024 | B2 | 2/2018 | Hao et al. |
| 9,944,145 | B2 | 4/2018 | Dillman et al. |
| 9,987,900 | B2 | 6/2018 | Farjoud et al. |
| 10,030,737 | B2 | 7/2018 | Dillman et al. |
| 10,619,696 | B2 | 4/2020 | Dillman et al. |
| 10,632,805 | B1 | 4/2020 | Rositch et al. |
| 11,199,239 | B2 | 12/2021 | Dumitru et al. |
| 11,255,401 | B2 | 2/2022 | Dillman et al. |
| 2005/0051935 | A1 | 3/2005 | Lanterman et al. |
| 2006/0163016 | A1 | 7/2006 | Ferkany |
| 2010/0140031 | A1 | 6/2010 | Miyasato |
| 2010/0236882 | A1 | 9/2010 | Uchiyama |
| 2011/0100775 | A1 | 5/2011 | Foister et al. |
| 2012/0160620 | A1 | 6/2012 | Yamashita et al. |
| 2012/0160624 | A1 | 6/2012 | Katayama et al. |
| 2012/0247890 | A1 | 10/2012 | Murakami |
| 2012/0312648 | A1 | 12/2012 | Yu et al. |
| 2012/0318623 | A1 | 12/2012 | Mombour |
| 2015/0290993 | A1 | 10/2015 | Dillman et al. |
| 2017/0009840 | A1 | 1/2017 | Hertz |
| 2017/0241502 | A1 * | 8/2017 | Rummel ................ F16F 9/348 |
| 2019/0178329 | A1 | 6/2019 | Dumitru et al. |
| 2019/0316650 | A1 | 10/2019 | Dillman et al. |
| 2020/0232533 | A1 | 7/2020 | Dillman et al. |

* cited by examiner

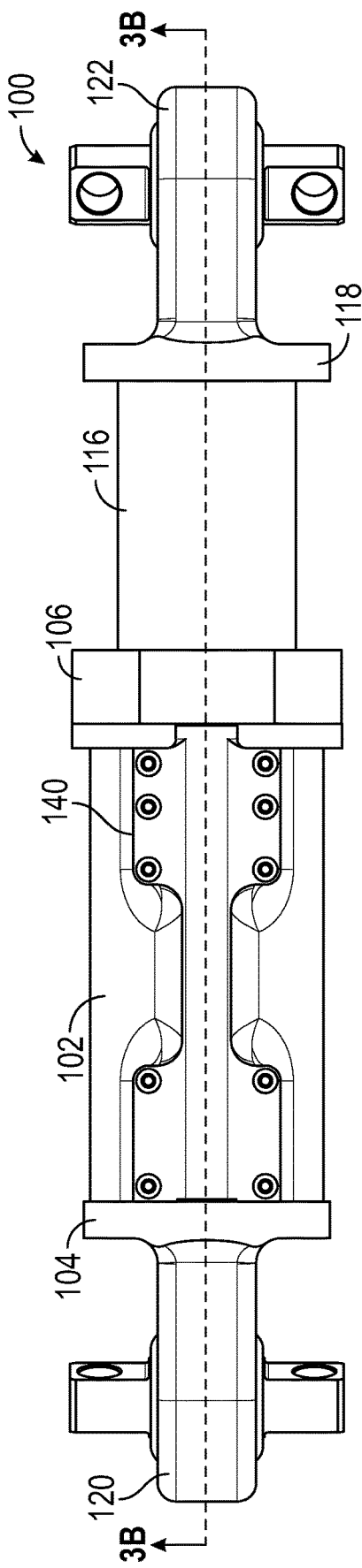
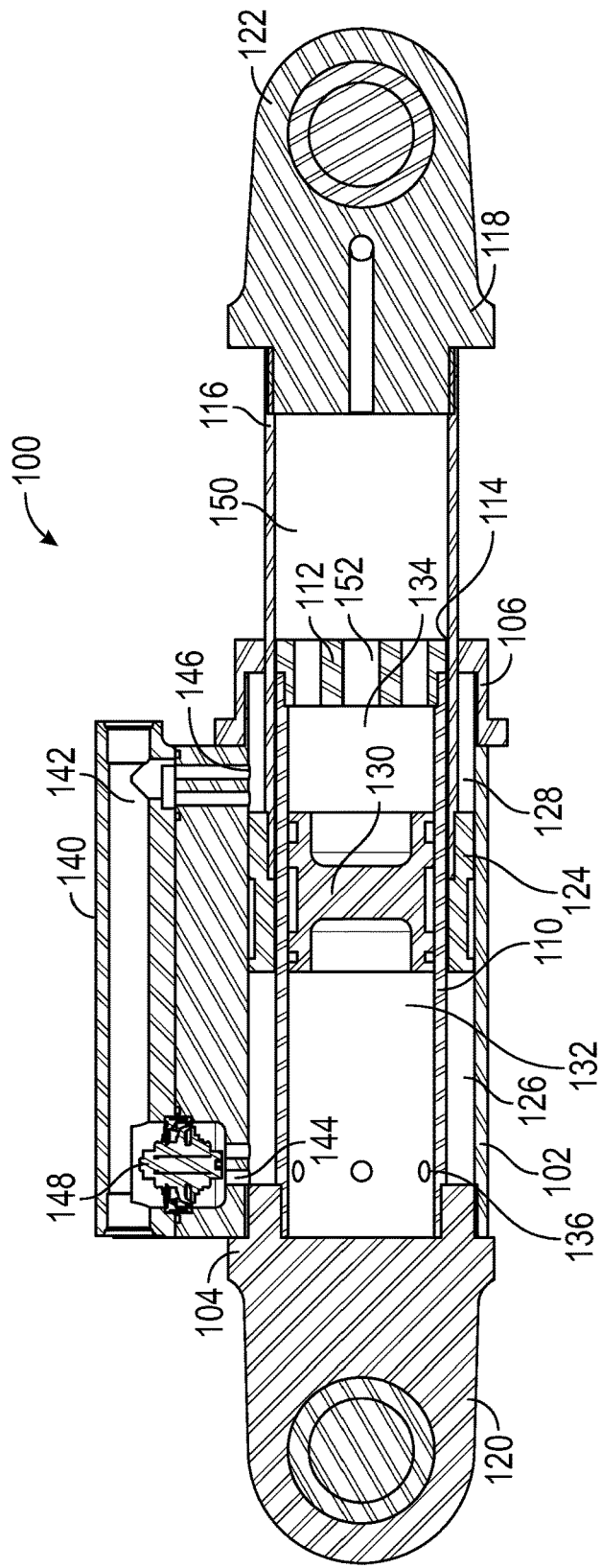
FIG. 3A
FIG. 3B

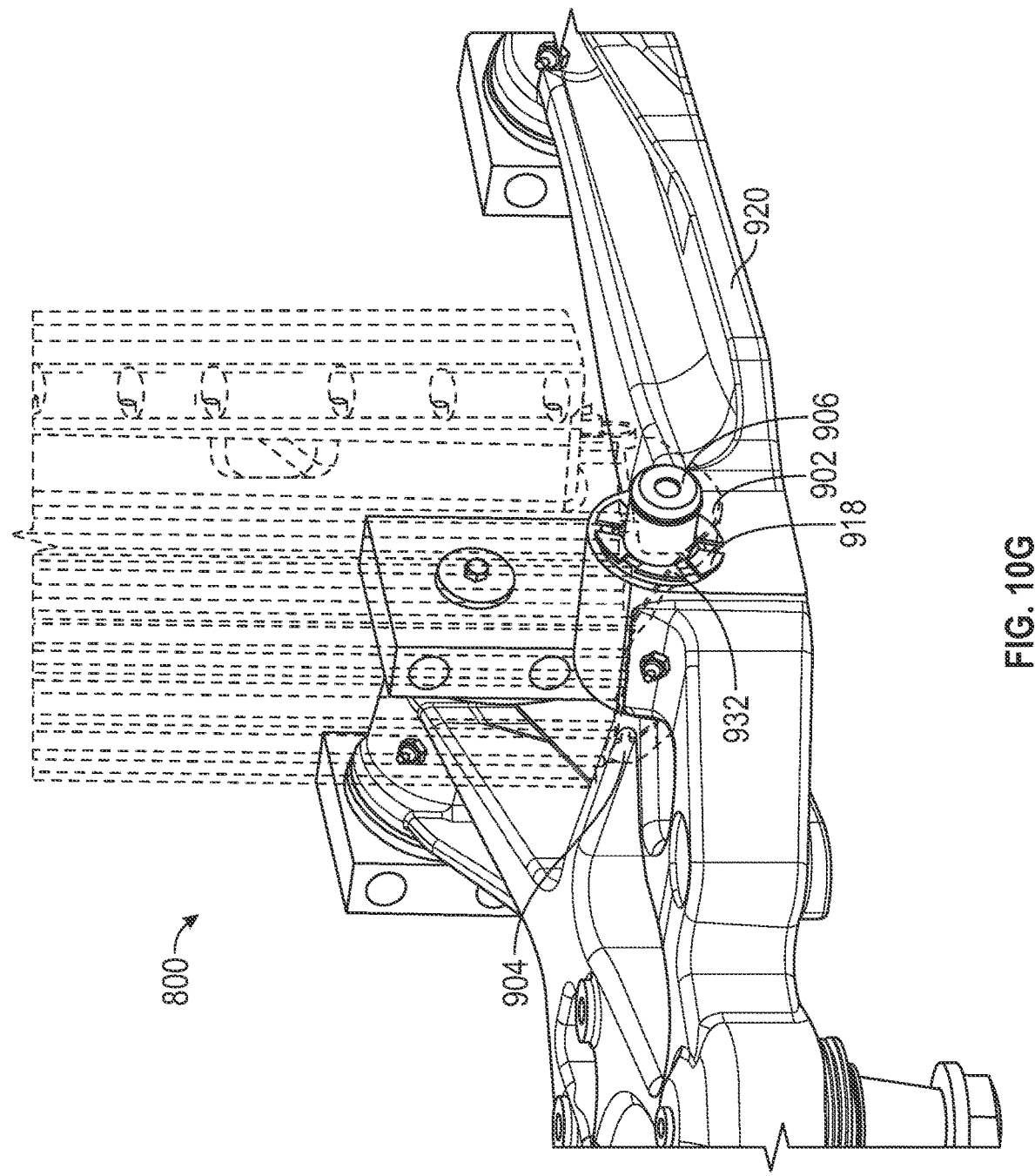

SUSPENSION ELEMENT SYSTEMS AND METHODS

CROSS-REFERENCE TO RELATED APPLICATIONS

This application is a continuation of U.S. patent application Ser. No. 16/859,225, filed Apr. 27, 2020, which is a continuation of U.S. patent application Ser. No. 15/956,974, filed Apr. 19, 2018, now U.S. Pat. No. 10,632,805, which claims the benefit of and priority to U.S. Provisional Application No. 62/491,132, filed Apr. 27, 2017, and U.S. Provisional Application No. 62/491,971, filed Apr. 28, 2017, all of which are incorporated herein by reference in their entireties.

BACKGROUND

The present disclosure relates generally to the field of vehicle suspension systems. More specifically, the present disclosure relates to dampers used in independent suspension systems that facilitate independent wheel movement as the vehicle encounters one or more obstacles (e.g., uneven terrain, potholes, curbs, etc.).

SUMMARY

One embodiment relates to a suspension element for use with a vehicle. The suspension element includes a main body, a tubular element, and a cap attached to one of the first end and the tubular element.

In any of the above embodiments, the suspension element may be rotatably coupled to a passage through a mounting portion of a support arm in a way that prevents migration of debris into the connection. A first opening may be disposed on the cap. A mounting pin may extend through the passage, the first opening, and at least one of a thrust washer and a seal. In any of the above embodiments, the seal may be received in an annular gap may be formed between an inner ring of the thrust washer and the mounting pin. An outer surface of the seal may be approximately flush with an inner surface of the thrust washer to prevent debris from migrating past either component. In any of the above embodiments, the first opening may be disposed on an ear of the cap. The thrust washer may further include a channel disposed on an outer surface of the thrust washer. The ear may be sized and positioned with respect to the thrust washer to allow debris to fall out from the channels.

In any of the above embodiments, the suspension element may be secured to a surface of a structural member of the vehicle via another cap and an upper mount, the upper mount including a first mounting member, a second mounting member, a third mounting member, and a fourth mounting member. To center the suspension element with respect to the vehicle structure and mounting members, a portion of the cap extends through an opening in the vehicle structure to engage with at least one of the third or fourth mounting members. In any of the above embodiments the first mounting member may be friction welded to the second mounting member. In any of the above embodiments, the third mounting member may be friction welded to the fourth mounting member.

In any of the above embodiments, the suspension element may further include a secondary piston having a contact surface, an opposing surface, and an inner cylindrical face defining a central aperture that receives the tubular element. The secondary piston defines a recoil chamber and an extension chamber. The secondary piston includes a damping groove including a first groove and a second groove, which are both disposed on the opposing surface of the secondary piston. In any of the above embodiments, the first groove and the second groove are non-radial to balance hydrodynamic forces across the secondary piston during and after a recoil event or jounce.

In some of the above embodiments, the secondary piston may include an inner groove and a contact groove that together with at least one of the first groove and the second groove form a channel that fluidly connects the recoil chamber and the extension chamber. In some of the above embodiments, at least one of the inner groove and the contact groove are shaped differently from at least one of the first groove and the second groove; for example, to tailor the damping characteristics of the recoil damper. In some of the above embodiments, the first groove and the second groove are substantially parallel to one another. Alternatively they may be substantially perpendicular to one another. In some of the above embodiments, the first groove and the second groove may be equally spaced around the circumference of the secondary piston to provide equal force balancing for the secondary piston. In some of the above embodiments, the suspension member may include a resilient member disposed between the secondary piston and the cap, the resilient member configured to bias the secondary piston into a position.

The invention is capable of other embodiments and of being carried out in various ways. Alternative exemplary embodiments relate to other features and combinations of features as may be recited in the claim.

BRIEF DESCRIPTION OF THE DRAWINGS

FIG. 3A is a side view of a suspension element, according to an exemplary embodiment.

FIG. 3B is a sectional view of the suspension element of FIG. 3A.

FIG. 10G is a side view of the mounting structure of FIG. 10A.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. The suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

Figure 1:
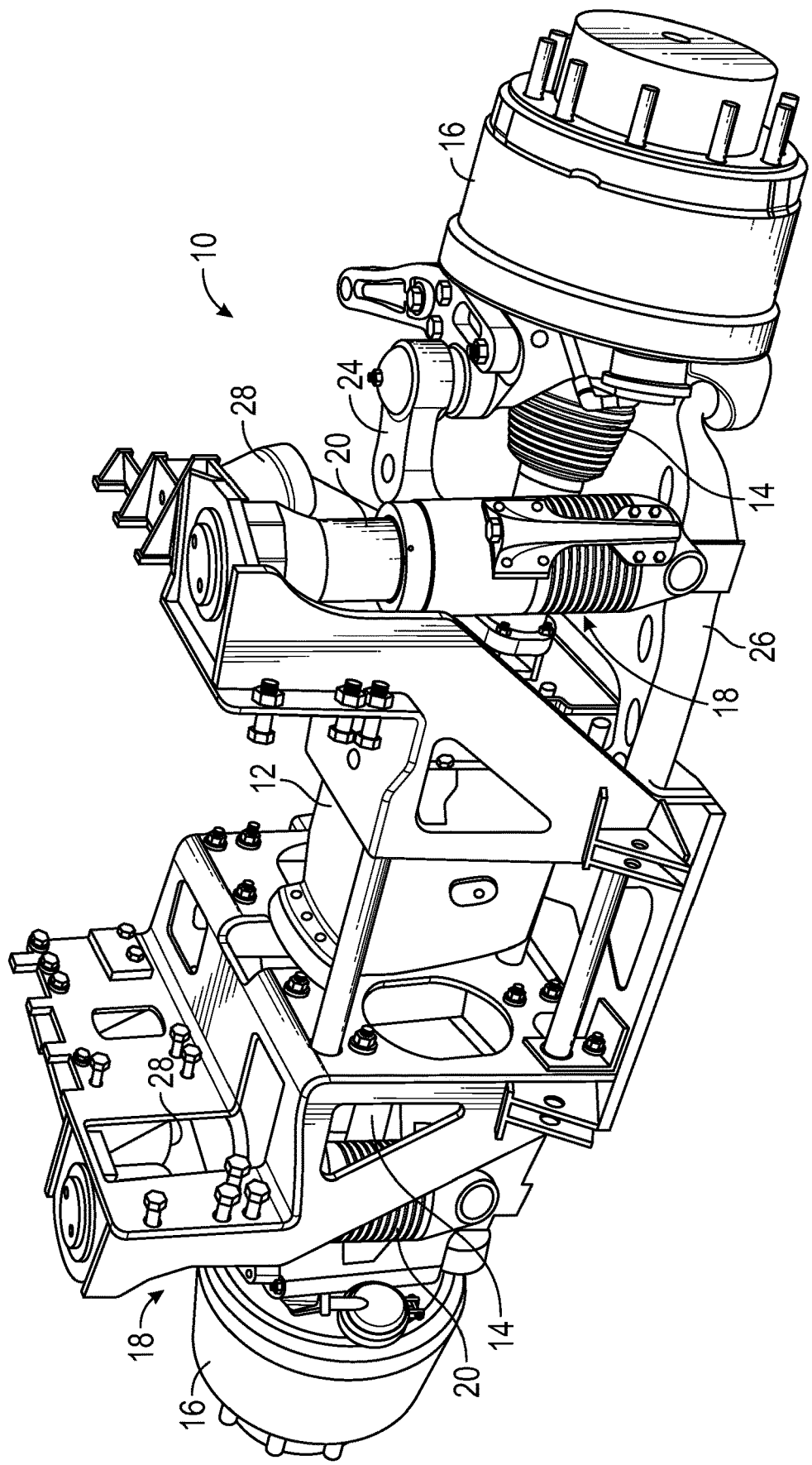
FIGS. 1-2 are perspective views of axle assemblies, according to alternative embodiments.
Figure 2:
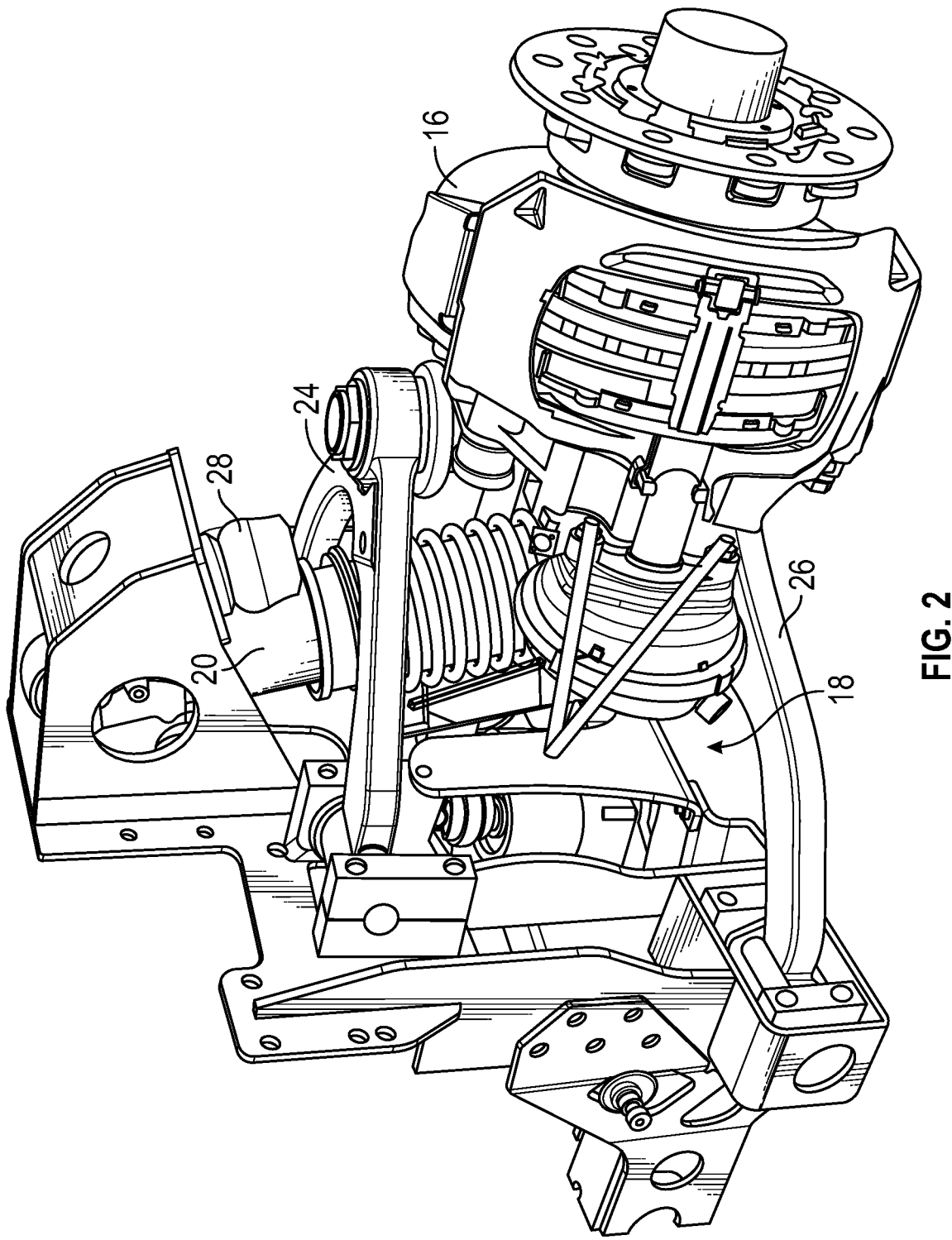

Referring to FIGS. 1-2, an axle assembly is configured for use with the vehicle. According to the exemplary embodiment shown in FIG. 1, an axle assembly 10 includes a differential 12 connected to half shafts 14, which are each connected to a wheel end assembly 16. Alternatively, each wheel end assembly 16 includes a prime mover (e.g., the axle assembly 10 includes electric motors that each drive one wheel). Alternatively, the wheel end assembly 16 may be implemented on a non-driven axle (e.g., an axle that includes or does not include a differential, half shaft, drive motor, or other component configured to provide a motive force, etc.); for example, as shown in FIG. 2. As shown in FIGS. 1-2, the wheel end assembly 16 is at least partially controlled (e.g., supported) by a suspension system 18, which includes a suspension element, shown as integrated spring damper 20, an upper support arm 24, and a lower support arm 26 coupling the wheel end assembly 16 to the vehicle body or part thereof (e.g., chassis, side plate, hull, etc.).

As shown in FIG. 1, the differential 12 is configured to be connected with a drive shaft of the vehicle, receiving rotational energy from a prime mover of the vehicle, such as a diesel engine. The differential 12 allocates torque provided by the prime mover between half shafts 14 of the axle assembly 10. The half shafts 14 deliver the rotational energy to the wheel end assemblies 16 of the axle assembly 10. The wheel end assemblies 16 may include brakes (e.g., disc brakes, drum brakes, etc.), gear reductions, steering components, wheel hubs, wheels, and other features. As shown in FIG. 2, the wheel end assemblies 16 include disc brakes. As the vehicle travels over uneven terrain, the upper and lower support arms 24, 26 at least partially guide the movement of each wheel end assembly 16, and a stopper, shown as cushion 28 provides an upper bound for movement of the wheel end assembly 16.

As shown in FIG. 2, the suspension system 18 includes various components configured to improve performance of the vehicle. The suspension system 18 may also include various auxiliary components (not shown) such as a high-pressure gas pump coupled to a gas spring, a plurality of high-pressure gas pumps each coupled to separate gas springs, or fewer gas pumps than gas springs. In some embodiments, at least one of the suspension components receive and provide a fluid (e.g., gas, hydraulic fluid) to lift or lower the body of the vehicle with respect to the ground thereby changing the ride height of the vehicle.

According to the exemplary embodiment shown in FIGS. 3A-3B, an integrated spring damper 100 is configured to act as a damper (e.g., a hydraulic damper) and a spring (e.g., a high pressure gas spring) simultaneously. The integrated spring damper 100 includes a main body 102 (e.g., cylinder, housing, base, etc.). In one embodiment, main body 102 is tubular. The ends of the main body 102 are closed by a cap 104 and a barrier 106 to define an internal volume. The internal volume of the main body 102 is separated into a central chamber and an annular, outer chamber by an inner tube 110 that extends from the cap 104 to the barrier 106. The end of the inner tube 110 proximate to the barrier 106 is closed with a cap 112. The cap 112 may be generally aligned with the barrier 106 (e.g., received in a central opening 114 in the barrier 106). The integrated spring damper 100 further includes a tubular (e.g., cylindrical, etc.) element, shown as main tube 116. In one embodiment, main tube 116 is tubular and defines an inner volume. The main tube 116 is received in the annular chamber of the internal volume of the main body 102. The main tube 116 is configured to translate with respect to the main body 102. According to an exemplary embodiment, the main tube 116 has an inner diameter that is approximately equal to the outer diameter of the inner tube 110 such that the inner tube 110 is received in the main tube 116 when the main tube 116 is disposed within the internal volume of the main body 102. The distal end of the main tube 116 is closed by a cap 118. The cap 104, barrier 106, cap 112, and cap 118 may be coupled to the respective components with a threaded connection or with another coupling mechanism (e.g., welding, brazing, interference fit, etc.).

According to an exemplary embodiment, the integrated spring damper 100 includes a first eyelet 120 and a second eyelet 122 with which the integrated spring damper 100 is coupled to an axle assembly. According to an exemplary embodiment, the integrated spring damper 100 is coupled on one end (e.g., with the first eyelet 120) to a moveable member of the axle assembly (e.g., an upper support arm, a lower support arm, etc.) and on the other end (e.g., with the second eyelet 122) to the vehicle, vehicle structural element, vehicle body, or part thereof (e.g., chassis, side plate, hull). According to an exemplary embodiment, the first eyelet 120 and the second eyelet are integrally formed with the cap 104 and the cap 118, respectively.

A main piston 124 is disposed in the outer annular chamber defined between the main body 102 and the inner tube 110. The main piston 124 is coupled to the main tube 116 and extends to an inner surface of the main body 102. The main piston 124 separates the outer annular chamber into first annular chamber 126 and a second annular chamber 128. When the main tube 116 translates relative to the main body 102, the main piston 124 changes the volume of the first annular chamber 126 and the second annular chamber 128. A dividing piston 130 (e.g., floating piston) is disposed in the inner chamber defined by the inner tube 110. The dividing piston 130 slidably engages the inner tube 110. The dividing piston 130 separates the inner chamber into first inner chamber 132 and a second inner chamber 134. The pistons 124 and 130 may be coupled to the sidewalls of the main body 102 and the inner tube 110 with a seal or other interfacing member (e.g., ring, wear band, guide ring, wear ring, etc.).

The first annular chamber 126, the second annular chamber 128, and the first inner chamber 132 contain a generally non-compressible fluid. In one embodiment, the first annular chamber 126, the second annular chamber 128, and the first inner chamber 132 are hydraulic chambers configured to contain a hydraulic fluid therein (e.g., water, hydraulic oil, etc.). The first inner chamber 132 is in fluid communication with the first annular chamber 126 through apertures 136 in the inner tube 110. The fluid may flow between the first annular chamber 126 and the second annular chamber 128 through a passage 142 (e.g., conduit, bore, etc.) in a bypass manifold 140. According to an exemplary embodiment, the bypass manifold 140 is a structure coupled (e.g., bolted) to the side of the main body 102 and the passage 142 is in fluid communication with the first annular chamber 126 through an aperture 144 in the main body 102 and with the second annular chamber 128 through an aperture 146 in the main body 102. Providing the bypass manifold 140 as a separate component coupled to the exterior of the main body 102 allows the bypass manifold 140 to be replaced to vary the behavior of the integrated spring damper 100, such as by changing the valving or adding optional features (e.g., position dependency).

The flow of fluid through the passage 142 is controlled by a flow control device 148. According to an exemplary embodiment, the flow control device 148 is a disk valve disposed within the bypass manifold 140 along the passage 142. In other embodiments, the flow control device 148 may be another device, such as a pop off valve, or an orifice. In other embodiments, the flow control device remotely positioned but in fluid communication with the first annular chamber 126 and the second annular chamber 128.

The second inner chamber 134 contains a generally compressible fluid that may include (e.g., at least 90%, at least 95%) an inert gas such as nitrogen, argon, or helium, among others. The second inner chamber 134 is in fluid communication with the internal volume 150 of the main tube 116 through apertures 152 in the cap 112. In some embodiments, the internal volume 150 of the main tube 116 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 100 is compressed or extended, the main tube 116 translates relative to the main body 102. The gas held in the second inner chamber 134 compresses or expands in response to relative movement between the main tube 116 and the dividing piston 130, which may remain relatively stationary but transmit pressure variations between the incompressible hydraulic fluid in the first inner chamber 132 and the compressible fluid in second inner chamber 134. The gas in the second inner chamber 134 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 100.

Movement of the main tube 116 relative to the main body 102 translates the main piston 124, causing the volume of the first annular chamber 126 and the second annular chamber 128 to vary. When the integrated spring damper 100 compresses, the volume of the first annular chamber 126 decreases while the volume of the second annular chamber 128 increases. The fluid is forced from the first annular chamber 126 through the passage 142 and past the flow control device 148 into the second annular chamber 128. The resistance to the flow of the fluid through the passage provides a damping function for the integrated spring damper 100 that is independent of the spring function. Movement of the main piston 124 also changes the pressure of the fluid within first inner chamber 132. Such pressure variation imparts a force on a first side of the dividing piston 130 that varies the pressure of the fluid within the second inner chamber 134.

Figure 4:
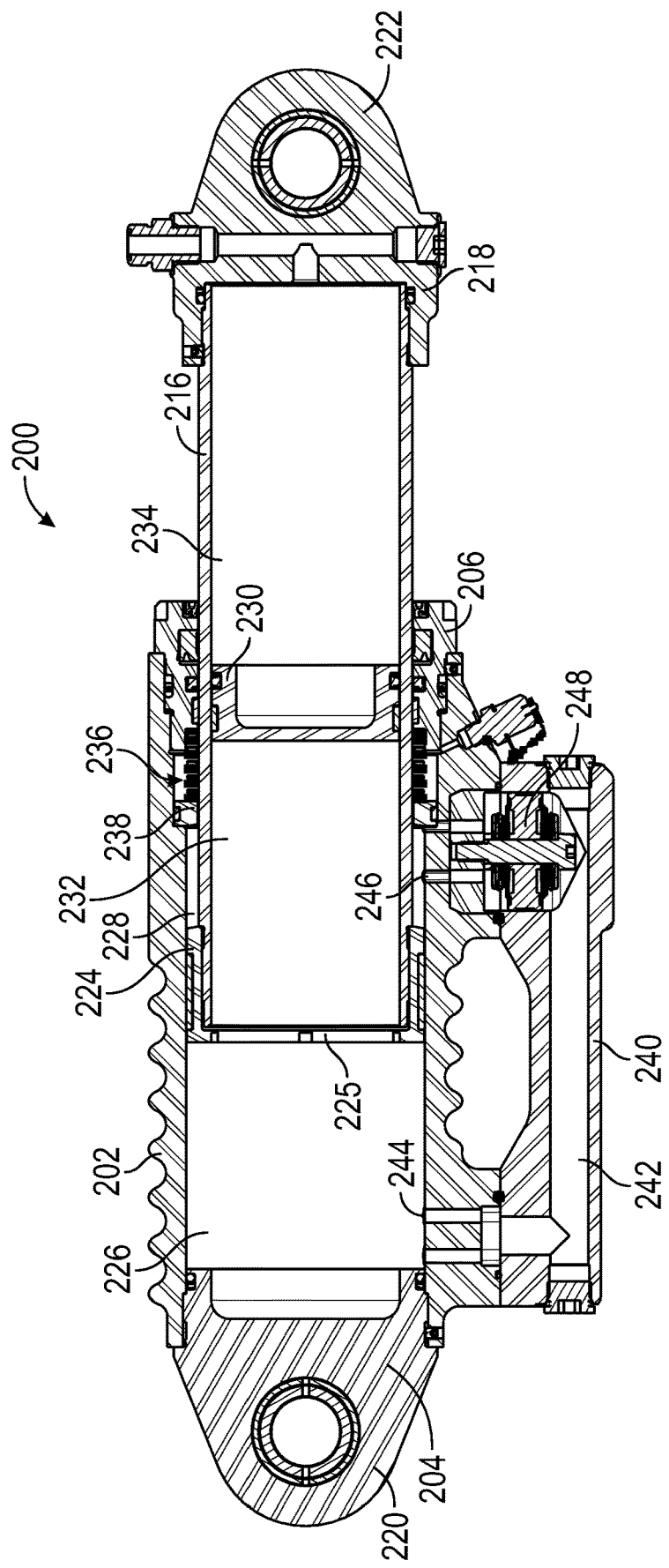
FIG. 4 is a sectional view of a suspension element, according to an alternative embodiment.

Referring to FIG. 4, an integrated spring damper assembly 200 is shown, according to another exemplary embodiment. The integrated spring damper assembly 200 includes a tubular element (e.g., cylindrical, etc.), shown as main body 202 (e.g., cylinder, housing, base, etc.). The ends of the main body 202 are closed by a cap 204 and a barrier 206 to define an internal volume. The integrated spring damper assembly 200 further includes a tubular element (e.g., cylindrical, etc.), shown as main tube 216. The main tube 216 is received in the internal volume of the main body 202. The main tube 216 is configured to translate with respect to the main body 202. The distal end of the main tube 216 is closed by a cap 218. The cap 204, barrier 206, and cap 218 may be coupled to the respective components with a threaded connection or with another coupling mechanism (e.g., welding, brazing, interference fit, etc.).

According to an exemplary embodiment, the integrated spring damper assembly 200 includes a first eyelet 220 and a second eyelet 222 with which the integrated spring damper assembly 200 is coupled to an axle assembly. According to an exemplary embodiment, the integrated spring damper assembly 200 is coupled on one end (e.g., with the first eyelet 220) to a moveable member of the axle assembly (e.g., an upper support arm, a lower support arm, etc.) and on the other end (e.g., with the second eyelet 222) to the vehicle, vehicle structural element, vehicle body, or part thereof (e.g., chassis, side plate, hull). According to an exemplary embodiment, the first eyelet 220 and the second eyelet 222 are integrally formed with the cap 204 and the cap 218, respectively.

A main piston 224 is disposed in the internal volume of the main body 202. The main piston 224 is coupled to the main tube 216 and slidably engages the main body 202. The main piston 224 separates the internal volume into a first chamber 226 (e.g., compression chamber) and a second chamber 228 (e.g., extension chamber). The first chamber 226 is a generally cylindrical chamber comprising the portion of the internal volume of the main body 202 between the main piston 224 and the cap 204. The second chamber 228 is an annular chamber defined between the main body 202 and the main tube 216 and extends between the main piston 224 and the barrier 206. When the main tube 216 translates relative to the main body 202, the main piston 224 changes the volume of the first chamber 226 and the second chamber 228. A dividing piston 230 (e.g., floating piston) is disposed in the main tube 216 and slidably engages the main tube 216. The dividing piston 230 separates the internal volume of the main tube 216 into the first inner chamber 232 and a second inner chamber 234. According to an exemplary embodiment, the first inner chamber 232 is open to (i.e., in fluid communication with) the first chamber 226.

A limiter, shown as recoil damper 236, is disposed within the internal volume of the main body 202 between the main piston 224 and the barrier 206. The recoil damper 236 is intended to reduce the risk of damage to the main piston 224, barrier 206, the sidewall of main body 202, or still another component of the integrated spring damper assembly 200 by reducing the forces imparted by the main piston 224 as it travels toward an end of stroke.

A recoil damper 236 dissipates energy thereby reducing the total energy of the integrated spring damper assembly 200. As the vehicle encounters a positive obstacle (e.g., a bump, a curb, etc.) or a negative obstacle (e.g., a depression, etc.), the main tube 216 moves relative to main body 202. Various factors including, among others, the speed of the vehicle, the weight of the vehicle, and the characteristics of the obstacle affect the energy imparted into the integrated spring damper assembly 200 by the obstacle. By way of example, main tube 216 translates away from the cap 204 of first eyelet 220 as a wheel of the vehicle encounters a negative obstacle. It should be understood that the main tube 216 possesses kinetic energy that contributes to the total energy of integrated spring damper assembly 200. Interaction of the recoil damper 236 with the main piston 224 dissipates energy thereby reducing the total energy of the integrated spring damper assembly 200. Such dissipated energy does not increase the kinetic energy of main tube 216 or main piston 224, according to an exemplary embodiment.

Figure 5:
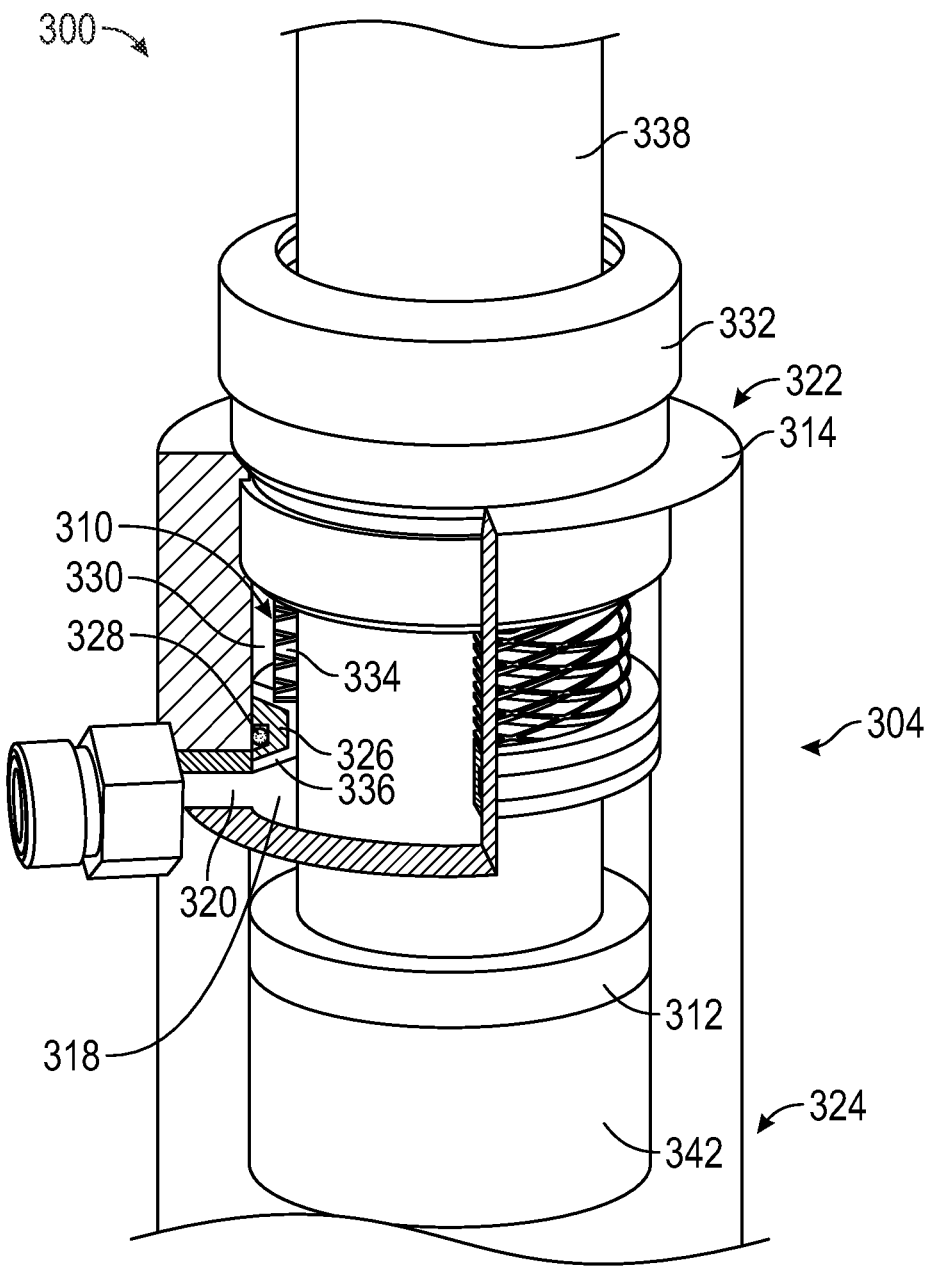
FIG. 5 is an elevation view of a damper assembly having a limiter that dissipates energy, according to an exemplary embodiment.

Referring to FIG. 5, a recoil damper 310 according to an exemplary embodiment is shown. To illustrate the design and operation of the recoil damper 310, FIG. 5 shows the recoil damper 310 integrated with a suspension component, shown as damper assembly 300. According to the exemplary embodiment shown in FIG. 5, damper assembly 300 includes a tubular element (e.g. cylindrical), shown as shaft 338, coupled to a body portion 304. As shown in FIG. 5, body portion 304 includes a tubular (e.g., cylindrical) main body, shown as housing 314, that includes a first end 322 and a second end 324. An end cap 332 is coupled to first end 322 of housing 314. Housing 314 includes a sidewall that defines an inner volume. The shaft 338 translates within the inner volume between an extended position and a retracted position. According to an exemplary embodiment, a main piston, shown as plunger 312, is positioned within the inner volume of housing 314 and coupled to an end of shaft 338. A limiter, shown as recoil damper 310, is disposed within the inner volume of housing 314 between plunger 312 and end cap 332. Recoil damper 310 is intended to reduce the risk of damage to plunger 312, end cap 332, the sidewall of housing 314, or still another component of damper assembly 300 by reducing the forces imparted by plunger 312 as it travels toward an end of stroke. Occupants within a vehicle experience large impulse forces as plunger 312 contacts end cap 332 or a component of the suspension system engages a hard stop. Recoil damper 310 reduces such impulse forces transmitted to occupants within the vehicle by dissipating a portion of the kinetic energy of plunger 312 and shaft 338 (i.e., provide a supplemental damping force) as damper assembly 300 reaches an end of stroke (e.g., as the piston reaches a recoil end of stroke, as the piston reaches a jounce end of stroke, etc.). According to an exemplary embodiment, recoil damper 310 reduces the forces imparted to occupants within the vehicle from 35,000 pounds to 20,000 pounds. The forces may be imparted due to the stored energy inside the spring returning the wheel end to the full rebound position.

As shown in FIG. 5, a plunger 312 separates the inner volume of a housing 314 into a compression chamber 316 and an extension chamber 318. As shown in FIG. 5, housing 314 also defines a port, shown as flow port 320. According to an exemplary embodiment, a fluid (e.g., hydraulic oil, water, a gas, etc.) is disposed within the inner volume of housing 314. As the plunger 312 moves toward a first end 322 of housing 314, the pressure of the fluid within extension chamber 318 increases. According to an exemplary embodiment, the fluid within extension chamber 318 flows outward through flow port 320. External valves (e.g. shim valves, etc.) restrict the flow of fluid from flow port 320 and provide a base level of damping forces. Such a base level of damping may vary based on the location, speed, or other characteristics of plunger 312. The damper assembly 300 shown in FIG. 5, provides a constant base level damping force as plunger 312 translates between the first end 322 and a second end 324 of housing 314.

According to an exemplary embodiment, recoil damper 310 includes a secondary piston, shown as secondary plunger 326. As shown in FIG. 5, secondary plunger 326 is an annular member positioned within extension chamber 318. Secondary plunger 326 includes a contact surface that is configured to engage plunger 312. An opposing surface of secondary plunger 326 is separated from the contact surface by the thickness of secondary plunger 326. According to an exemplary embodiment, secondary plunger 326 is coupled to an inner sidewall of housing 314 with a seal (e.g., ring, wear band, guide ring, wear ring, etc.), shown as interfacing member 328. A recoil chamber 330 is formed by the volume of extension chamber 318 located between secondary plunger 326 and end cap 332.

As shown in FIG. 5, interfacing member 328 is a ring that has a circular cross-sectional shape. According to an alternative embodiment, interfacing member 328 may have a rectangular, square, polygonal, or still other cross-sectional shape. The interfacing member 328 is manufactured from a rigid material (e.g., a hard plastic, etc.). According to an exemplary embodiment, the rigid interfacing member 328 prevents fluid flow between the inner sidewall of housing 314 and secondary plunger 326. A rigid interfacing member 328 may also center secondary plunger 326 within the bore of housing 314 thereby reducing the likelihood of wear between an outer surface of secondary plunger 326 and housing 314. According to an alternative embodiment, interfacing member 328 is manufactured from another material (e.g., glass reinforced nylon, a nitrile rubber, etc.).

According to an exemplary embodiment, recoil damper 310 includes a resilient member, shown as return spring 334. As shown in FIG. 5, return spring 334 extends between a first end that engages secondary plunger 326 and a second end that engages end cap 332. Return spring 334 may be an interlaced wave spring (i.e., a flat wire compression spring), a coil spring, or another type of spring. Return spring 334 positions secondary plunger 326 within housing 314. The spring force generated by return spring 334 may overcome gravity (e.g., where damper assembly 300 is positioned in a vehicle suspension system with secondary plunger 326 above end cap 332) or may position secondary plunger 326 more quickly than gravity alone (e.g., where damper assembly 300 is positioned in a vehicle suspension system with secondary plunger 326 below end cap 332, as shown in FIG. 5). Return spring 334 is not intended to damp the movement of plunger 312, and return spring 334 may have a relatively small spring constant (e.g., less than 500 pounds per inch). According to an alternative embodiment, recoil damper 310 does not include a return spring 334. Such a recoil damper may reposition secondary plunger 326 using gravity or an alternative device.

According to an exemplary embodiment, secondary plunger 326 defines a channel (i.e., track, depression, kerf, notch, opening, recess, slit, etc.), shown as damping groove 336. As shown in FIG. 5, damping groove 336 extends radially outward across the contact surface of secondary plunger 326, along an inner cylindrical face of secondary plunger 326, and along the opposing surface of secondary plunger 326. According to an alternative embodiment, damping groove 336 extends only along the contact surface of secondary plunger 326. According to still another alternative embodiment, damping groove 336 extends across the contact surface and along the inner cylindrical face of secondary plunger 326. As shown in FIG. 5, secondary plunger 326 defines two damping grooves 336. According to an alternative embodiment, secondary plunger 326 defines more or fewer damping grooves 336. Damping groove 336 is sized to provide particular flow characteristics. According to an exemplary embodiment, the channel is defined along an axis extending radially outward from a centerline of secondary plunger 326. According to an alternative embodiment, the channel is curvilinear or irregularly shaped. According to an exemplary embodiment, the channel has a square cross-sectional shape in a plane that is normal to the axis extending from the centerline of secondary plunger 326. According to an alternative embodiment, the channel has another cross-sectional shape (e.g., rectangular, circular, semicircular, parabolic, etc.).

As shown in FIG. 5, plunger 312 defines a contact surface that engages the contact surface of secondary plunger 326. According to an exemplary embodiment, the contact surface of plunger 312 and the contact surface of secondary plunger 326 are complementary (i.e., corresponding, matched, correlative, etc.) thereby reducing the likelihood that pressurized fluid will seep between recoil chamber 330 and extension chamber 318 across the contact surfaces of plunger 312 and secondary plunger 326. According to an alternative embodiment, a seal is positioned between plunger 312 and secondary plunger 326.

According to an exemplary embodiment, a shaft 338 extends through the secondary plunger 326 and is connected to the plunger 312 (see FIG. 5). According to an alternative embodiment, a shaft does not extend through secondary plunger (not shown). In this alternative embodiment, a damper assembly may include a shaft that is reversed; for example, a shaft that projects toward a second end of a housing from a plunger. In this alternative embodiment, a limiter (e.g., a recoil damper) may be positioned between the plunger and an end cap of the housing. The limiter may provide supplemental damping forces as the plunger approaches an end of a stroke (e.g., full compression). According to the exemplary embodiment shown in FIG. 5, plunger 312 and secondary plunger 326 are disk shaped. According to an alternative embodiment, plunger 312 and secondary plunger 326 have still another shape.

According to an exemplary embodiment, the various components of damper assembly 300 (e.g., the sidewall of housing 314, plunger 312, secondary plunger 326, shaft 338, etc.) have a circular cross section. According to an alternative embodiment, the various components of damper assembly 300 may include a different cross-sectional shape (e.g., rectangular, square, hexagonal, etc.). While shown in FIG. 5 as having a particular length, width, and thickness, it should be understood that the components of damper assembly 300 may be otherwise sized (e.g., to suit a particular application).

Figure 6A:
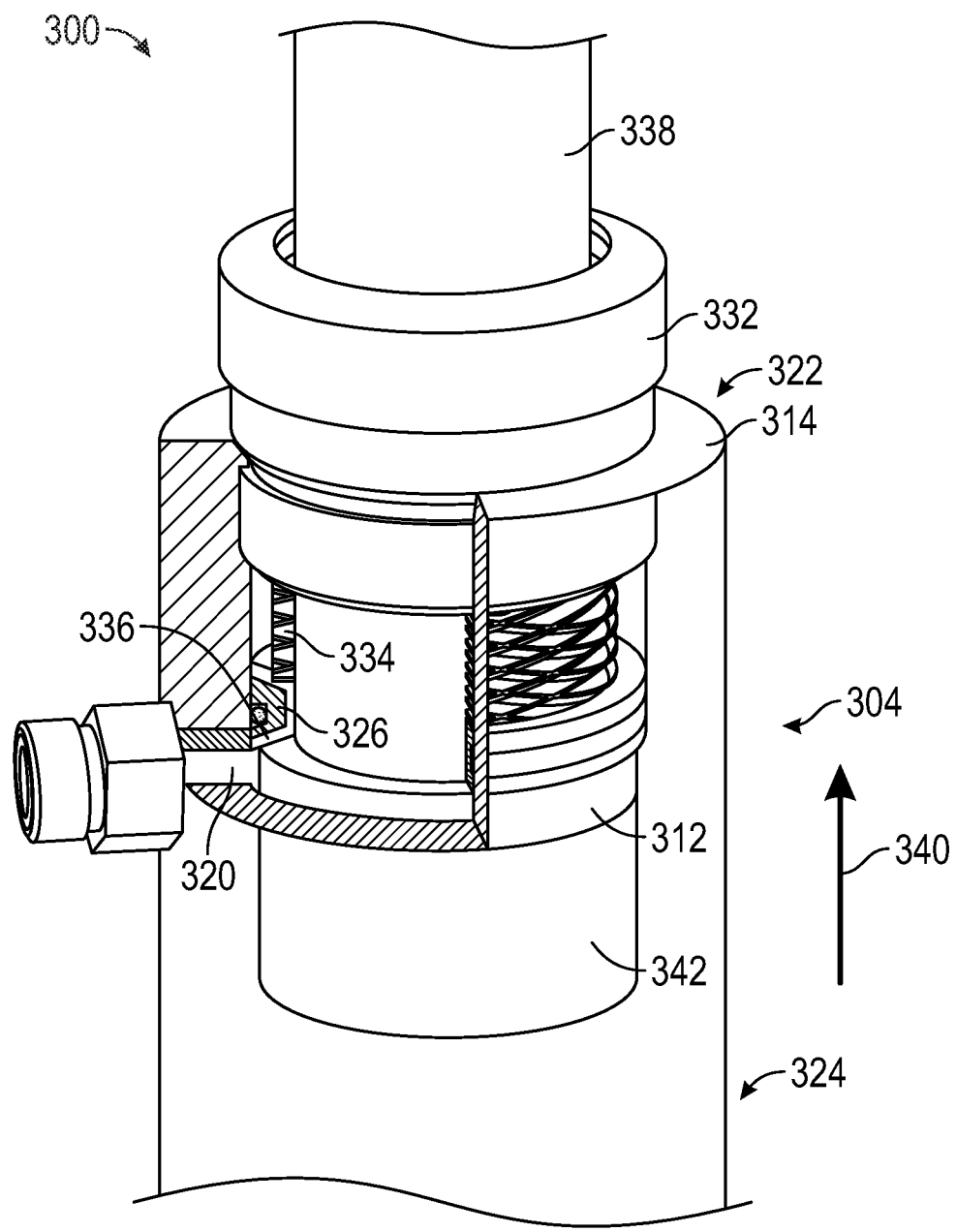
FIGS. 6A-6D are elevation views of the damper assembly of FIG. 5 in various stages of compression.
Figure 6B:
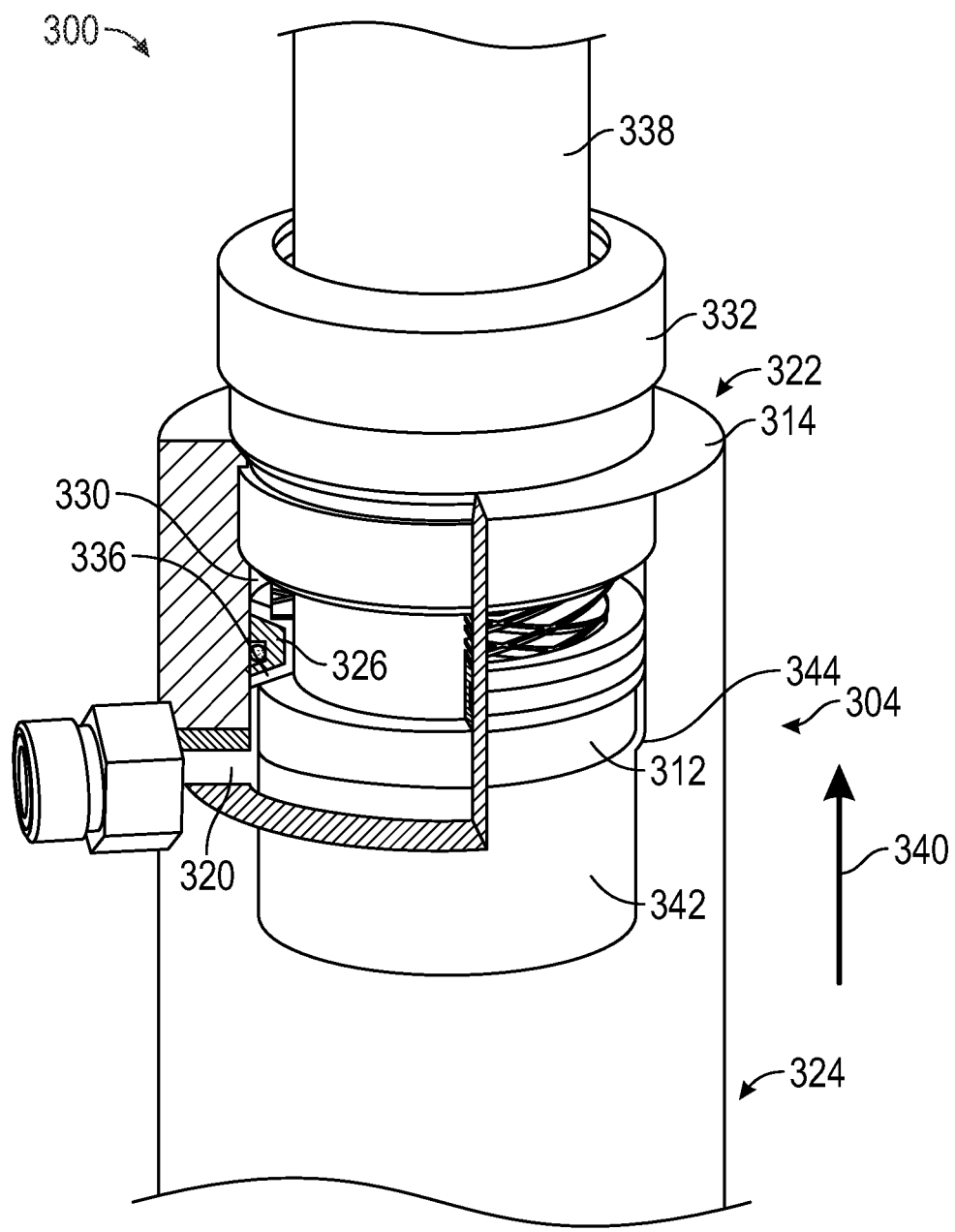
Figure 6C:
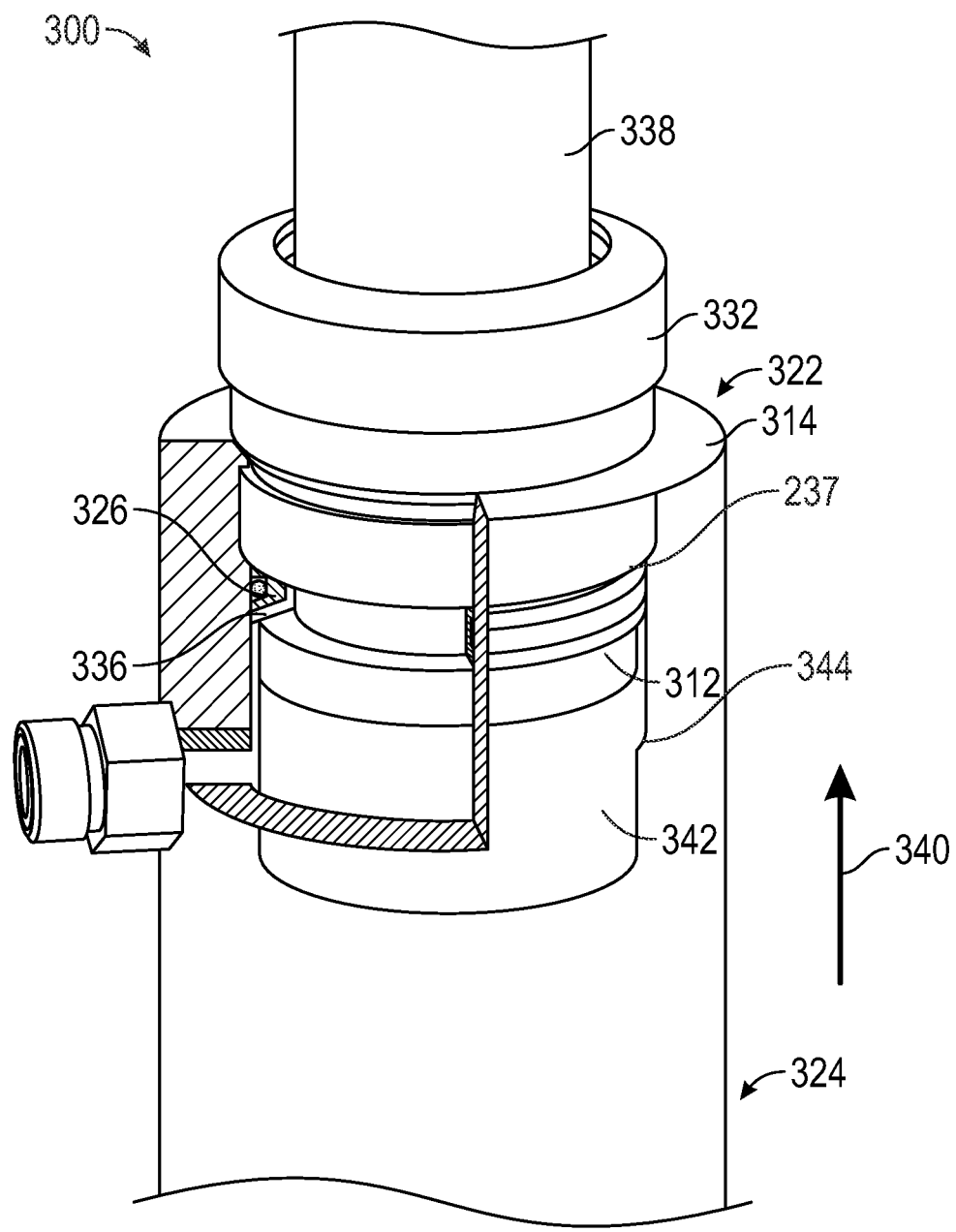
Figure 6D:
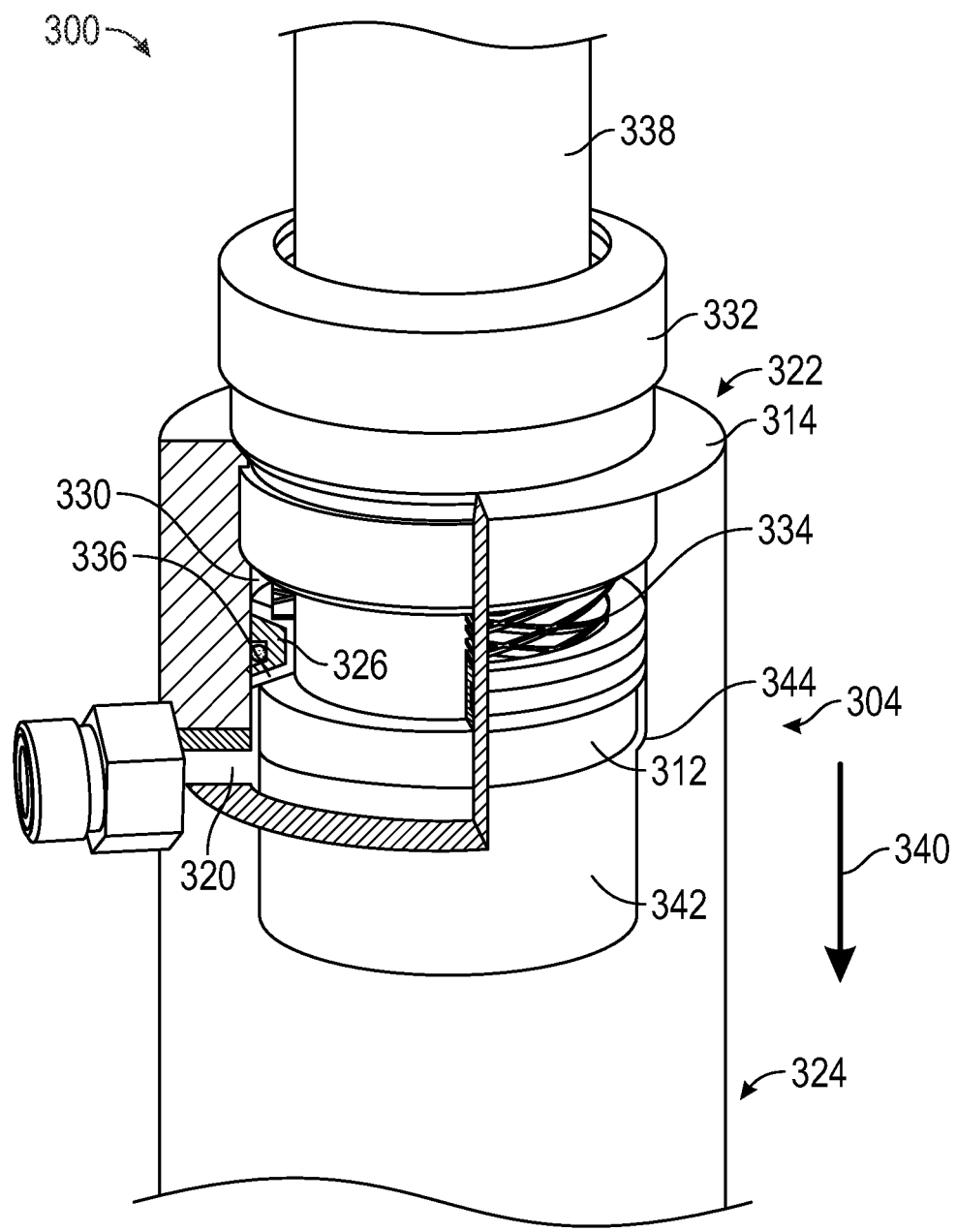

According to the exemplary embodiment shown in FIGS. 5-6D, plunger 312 is actuatable within housing 314 from a first location that is offset from secondary plunger 326 (e.g., the position shown in FIG. 5) to a second position where the contact surface of plunger 312 engages with (i.e., contacts, interfaces with, etc.) the contact surface of secondary plunger 326 (e.g., the position shown in FIG. 6A). As shown in FIG. 6A, plunger 312 translates within housing 314 along a direction of travel 340. Such motion may occur, by way of example, as the damper assembly 300 approaches an extension end of stroke (e.g., in a recoil motion). As shown in FIG. 6A, plunger 312 moves along direction of travel 340 such that the contact surface of plunger 312 engages the contact surface of secondary plunger 326. As the contact surface of plunger 312 engages the contact surface of secondary plunger 326, the damping groove 336 of secondary plunger 326 and the contact surface of plunger 312 form a flow conduit.

According to an alternative embodiment, plunger 312 defines a channel. The channel of plunger 312 may correspond to damping groove 336 of plunger 312 such that the channel of plunger 312 and damping groove 336 of secondary plunger 326 together form a flow conduit. In other embodiments, the channel of plunger 312 does not correspond to damping groove 336 of plunger 312 such that a plurality of flow conduits are formed between the damping groove 336 and the contact surface of plunger 312 and the channels of plunger 312 and the contact surface of secondary plunger 326. According to another alternative embodiment, secondary plunger 326 does not include damping groove 336, and a channel defined within plunger 312 and a contact surface of plunger 312 form the flow conduit.

As plunger 312 translates between the position shown in FIG. 6A to the position shown in FIG. 6B, fluid flows from recoil chamber 330, between secondary plunger 326 and shaft 338, through the conduit defined by damping groove 336 and the contact surface of plunger 312, through a passage between plunger 312 and the sidewall of housing 314, and into compression chamber 342. According to an exemplary embodiment, the conduit restricts the flow of fluid from recoil chamber 330 thereby dissipating energy and providing a supplemental damping force. According to an exemplary embodiment, damping groove 336 is positioned to reduce the buildup of debris and maintain an unobstructed flow channel along the conduit formed by damping groove 336 and the contact surface of plunger 312. Wear between components of damper assembly 300, oxidation, or still other conditions may generate debris in the fluid of damper assembly 300. As shown in FIGS. 5-6D, damping groove 336 is defined across a contact surface of secondary plunger 326. Fluid flowing through the inner volume of housing 314 (e.g., due to translation of plunger 312 within housing 314) flushes debris from damping groove 336. Such flushing and the movement of shaft 338 relative to secondary plunger 326 reduce the risk of debris obstructing the fluid flow path between recoil chamber 330 and compression chamber 342 (e.g., between an inner surface of secondary plunger 326 and an outer surface of shaft 338).

According to an exemplary embodiment, the amount of energy dissipated and the supplemental damping forces provided by recoil damper 310 (e.g., due to fluid flow through the conduit) is related to the shape of damping groove 336. According to an exemplary embodiment, fluid flow does not occur between secondary plunger 326 and the sidewall of housing 314. Secondary plunger 326 and interfacing member 328 limit fluid flow between recoil chamber 330 and compression chamber 342 to a flow path through the conduit. Recoil damper 310 thereby generates a fluid flow path through the conduit, and interfacing member 328 facilitates determining the expected performance characteristics (e.g., the amount of energy dissipated, the supplemental damping forces provided, etc.) of recoil damper 310. Such performance characteristics may be tuned as a function only of the features of damping groove 336, according to an exemplary embodiment. Limiting fluid from flowing between secondary plunger 326 and an inner sidewall of housing 314 also provides more predictable and uniform energy dissipation and supplemental damping forces (i.e., additional flow paths may introduce additional variability into the energy dissipated by a limiter).

Referring next to FIG. 6C, plunger 312 maintains engagement with secondary plunger 326 and continues to translate along direction of travel 340. According to an exemplary embodiment, the end cap 332 is a hard stop for the motion of damper assembly 300 at an end of stroke (e.g., extension, compression, etc.). As shown in FIG. 6C, end cap 332 is a hard stop for an extension end of stroke for damper assembly 300. According to an exemplary embodiment, the extension forces from plunger 312 and shaft 338 are imparted to end cap 332 through secondary plunger 326. The secondary plunger 326 and the flow of fluid through the conduit reduces the magnitude of the extension forces and the total energy imparted on cap 332 by plunger 312 and shaft 338.

According to an exemplary embodiment, end cap 332 includes a contact end 333 and has a cylindrical shape that defines an inner volume. The opposing surface of secondary plunger 326 engages contact end 333 of end cap 332 to limit further movement of plunger 312 and shaft 338 along direction of travel 340. It should be understood that return spring 334 compresses as plunger 312 and secondary plunger 326 travel toward end cap 332. According to an exemplary embodiment, return spring 334 has an outer diameter that is smaller than contact end 333 of end cap 332 such that return spring 334 extends within the inner volume of end cap 332. Return spring 334 nests within the inner volume of cap 332 as plunger 312 and secondary plunger 326 translate toward end cap 332 along direction of travel 340.

According to an alternative embodiment, a vehicle suspension system includes an external hard stop that interfaces with another suspension component. By way of example, the suspension system may include a polymeric cushion coupled to a chassis of the vehicle that contacts a swing arm. Secondary plunger 326 in such a suspension system may not contact end cap 332 (i.e., the end of stroke for the installed damper assembly 300 may occur before maximum extension). According to an alternative embodiment, the suspension system includes an external hard stop (e.g., a polymeric cushion) and also a secondary plunger 326 that engages end cap 332 to distribute the total stopping forces to various suspension components. According to still another alternative embodiment, damper assembly 300 includes another type of internal hard stop (e.g., a snap ring positioned within and internal groove of housing 314, a stud protruding into the inner volume of housing 314, etc.). The internal hard stop may engage plunger 312, secondary plunger 326, or still another component of damper assembly 300.

Referring next to FIG. 6D, plunger 312 translates along direction of travel 282 and away from secondary plunger 326. By way of example, such motion may occur after the vehicle has encountered a negative obstacle as the wheel end begins to travel upward thereby compressing damper assembly 300. According to an alternative embodiment, the motion of plunger 312 away from secondary plunger 326 occurs after the vehicle has encountered a positive obstacle and the wheel end begins to travel downward thereby extending damper assembly 300 (e.g., where recoil damper 310 is incorporated to dissipate energy at a jounce end of stroke). Translation of plunger 312 along direction of travel 282 increases the pressure of the fluid within compression chamber 342 and decreases the pressure of the fluid within recoil chamber 330 and extension chamber 318. Fluid flows into extension chamber 318 through flow port 320 as plunger 312 translates along the direction of travel 340, according to an exemplary embodiment.

As shown in FIG. 6D, the sidewall of housing 314 includes first portion having a first diameter and a second portion having a second diameter, the transition between the first diameter and the second diameter forming a shoulder, shown as step 344. According to an exemplary embodiment, the length of the first portion defines the distance over which recoil damper 310 dissipates energy and provides a supplemental damping force. As shown in FIG. 6D, secondary plunger 326 is coupled to the first portion with interfacing member 328. As shown in FIG. 6D, the diameter of secondary plunger 326 is greater than the second diameter such that the secondary plunger 326 translates only within the first portion of housing 314. Step 344 thereby limits the motion of secondary plunger 326 and prevents secondary plunger 326 from sliding (e.g., due to gravity, due to locking forces between secondary plunger 326 and plunger 312, etc.) toward the second end 324 of housing 314. According to an exemplary embodiment, plunger 312 has a diameter that is approximately equal to the second diameter and is configured to translate along both the first portion and the second portion of housing 314. In some embodiments, plunger 312 is coupled to housing 314 with an intermediate seal.

According to an exemplary embodiment, return spring 334 includes a first end coupled to end cap 332 and a second end coupled to secondary plunger 326. As plunger 312 translates along direction of travel 282, return spring 334 extends from a contracted position (e.g., nested within end cap 332) to an extended position. According to an exemplary embodiment, the contact surface of secondary plunger 326 engages step 344 when return spring 334 is in the extended position. The extension of return spring 334 repositions secondary plunger 326 such that recoil damper 310 may again dissipate energy and provide a supplemental damping force (e.g., as the vehicle interacts with a subsequent positive or negative obstacle). As return spring 334 extends, fluid is drawn from extension chamber 318 into recoil chamber 330 such that fluid is again available to flow through the conduit, dissipate energy, and provide a supplemental damping force. According to an alternative embodiment, recoil damper 310 does not include return spring 334 and secondary plunger 326 travels downward toward step 344 due to another force (e.g., coupling forces between plunger 312 and secondary plunger 326, gravitation forces, etc.).

As shown in FIG. 6D, translation of plunger 312 along the direction of travel 340 from the position shown in FIG. 6C separates plunger 312 from the secondary plunger 326. According to an alternative embodiment, plunger 312 maintains engagement with the secondary plunger 326 until the secondary plunger 326 engages step 344. According to an exemplary embodiment, damping groove 336 facilitates separation of plunger 312 from the secondary plunger 326 as plunger 312 translates along direction of travel 340. Damping groove 336 reduces the risk that coupling forces will lock plunger 312 to the secondary plunger 326 (e.g., due to contact between the two otherwise smooth corresponding surfaces). Such coupling forces may otherwise result in the translation of secondary plunger 326 along the length of housing 314 while in contact with plunger 312, the combination of secondary plunger 326 and plunger 312 providing supplemental damping forces in unintended stroke positions (e.g., in locations other than at an end of housing 314, etc.).

Figure 7A:
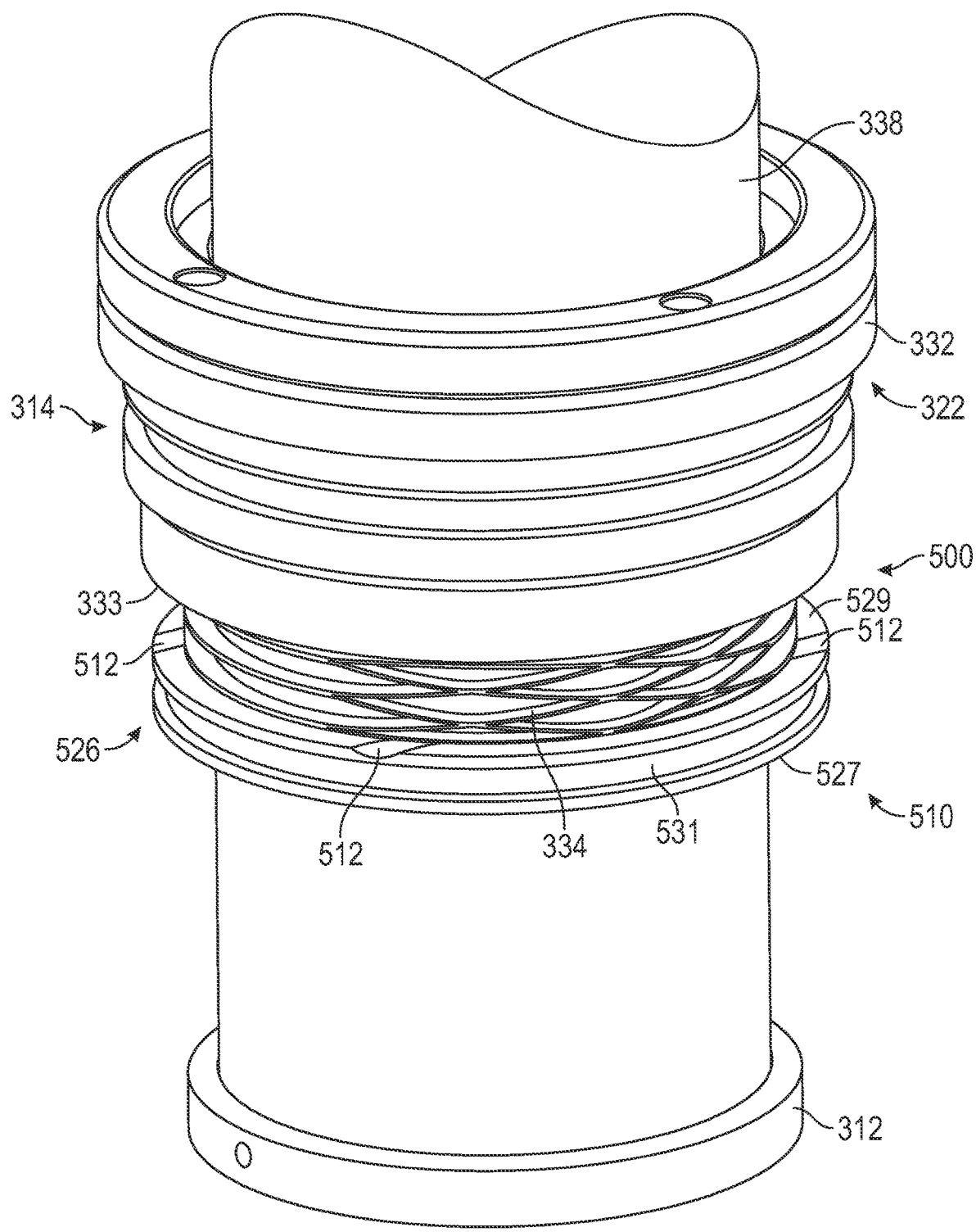
FIG. 7A is an elevation view of a damper assembly, according to an exemplary embodiment.
Figure 7B:
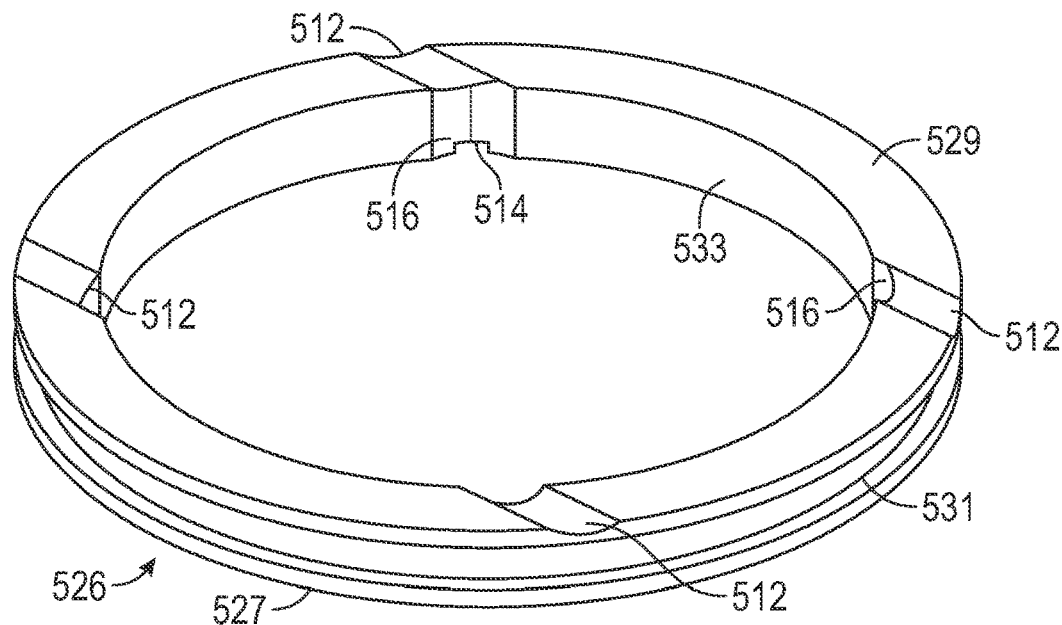
FIG. 7B is an elevation view of a secondary piston of a damper, according to an exemplary embodiment.
Figure 7C:
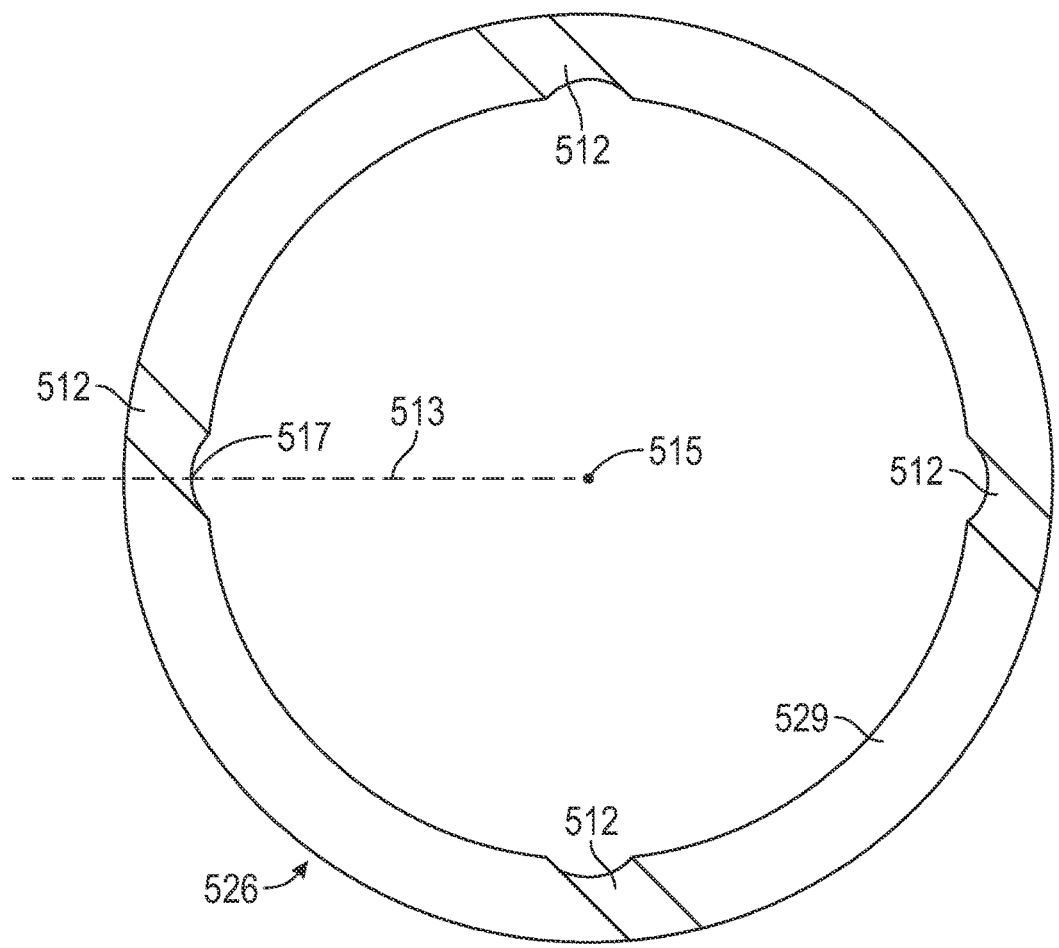
FIG. 7C is a top view of a secondary piston of a damper, according to an exemplary embodiment.

Referring now to FIGS. 7A-7C a suspension component, shown as a damper assembly 500, is shown according to an exemplary embodiment. The damper assembly 500 may be an integrated spring damper. The integrated spring damper may have a damping element that dissipates energy and a spring element that absorbs energy. Damper assembly 500 may be generally similar in structure to the damper assembly 300 discussed above. Like reference numerals are used in FIG. 7A to refer to features of the damper assembly 500 that may be similar to or the same as those of the damper assembly 300. In the example shown in FIG. 7A, a side wall of the housing 314 is removed for purposes of illustration. However, it should be understood that the housing 314 still includes such a side wall, which defines an internal volume.

As shown in FIG. 7A, a shaft 338 may translate within an internal volume defined by the inner surface of the housing 314 (shown in FIG. 6D). The shaft 338 may translate between an extended position and a retracted position. In an exemplary embodiment, a piston, shown as a plunger 312, is coupled to the shaft 338 such that the plunger 312 moves within the housing 314 (shown in FIG. 6D) in a manner that corresponds to the translation of the shaft 338. A limiter, shown as a recoil damper 510, may also be disposed within the housing 314 (shown in FIG. 6D), between the plunger 312 and end cap 332. In an exemplary embodiment, the recoil damper 510 is similar to the recoil damper 310.

Recoil damper 510 includes a piston, shown as secondary plunger 526. As shown in FIG. 7A, secondary plunger 526, is an annular member positioned within an extension chamber. Secondary plunger 526 includes a contact surface 527 that is configured to engage plunger 312. An opposing surface 529 of secondary plunger 526 is separated from the contact surface 527 by the thickness of secondary plunger 526. According to an exemplary embodiment, secondary plunger 526 is coupled to an inner sidewall of housing 314 (shown in FIG. 6D) with a seal (e.g., ring, wear band, guide ring, wear ring, etc.). In various embodiments, an outer surface of the secondary plunger 526 includes a groove 531 that extends throughout the entire circumference of the secondary plunger 526. The groove 531 is configured to receive a seal that couples the secondary plunger 526 to the side wall of the housing 314 (shown in FIG. 6D). In an exemplary embodiment, the seal is similar to the interfacing member 328.

According to an exemplary embodiment, recoil damper 510 includes a resilient member, shown as return spring 334. As shown in FIG. 7A, return spring 334 extends between a first end that engages secondary plunger 526 and a second end that engages end cap 332. Return spring 334 may be an interlaced wave spring (i.e., a flat wire compression spring), a coil spring, or another type of spring. Return spring 334 positions secondary plunger 526 within housing 314 (shown in FIG. 6D). The spring force generated by return spring 334 may overcome gravity (e.g., where damper assembly 500 is positioned in a vehicle suspension system with secondary plunger 526 above end cap 332) or may position secondary plunger 526 more quickly than gravity alone (e.g., where damper assembly 500 is positioned in a vehicle suspension system with secondary plunger 526 below end cap 332, as shown in FIG. 5). Return spring 334 is not intended to damp the movement of plunger 312, and return spring 334 may have a relatively small spring constant (e.g., less than 500 pounds per inch). According to an alternative embodiment, recoil damper 510 does not include a return spring 334. Such a recoil damper may reposition secondary plunger 526 using gravity or an alternative device.

As shown in FIG. 7B, secondary plunger 526 defines a plurality of channels (i.e., track, depression, kerf, notch, opening, recess, slit, etc.) through which hydraulic fluid may flow between different chambers created by the secondary plunger 526 (i.e., a first chamber between the primary plunger 312 and the secondary plunger 526 and a second chamber between the secondary plunger 526 and the end 324 of the housing 314). In the exemplary embodiment shown, each channel includes an opposite surface groove 512 disposed on the opposite surface 529, an inner groove 516 disposed on an inner cylindrical face 533 of the secondary plunger 526, and a contact groove 514 disposed on the contact surface 527 of the plunger. In the example shown, each of the opposite surface groove 512 and the contact groove 514 extend across portions of the surfaces 508 and 511. In an exemplary embodiment, the grooves 512-516 are substantially similar in shape. The grooves 512-516 may be arcuate and have a constant radius of curvature. In an alternative embodiment, the opposite surface groove 512 and the inner groove 516 are similarly shaped, while the contact groove 514 is differently shaped. In one embodiment, the opposite surface groove 512 and the inner groove 516 are curved, while the contact groove 514 is substantially rectangular and narrower than the opposite surface groove 512 and the contact groove 516. In some embodiments, the contact surface 527 of the secondary plunger 526 engages with an upper surface of the plunger 312 when the damper assembly 500 is in a contracted position, and the contact groove 514 interfaces with the upper surface to form a conduit for hydraulic fluid to flow to a chamber above the secondary plunger 526.

As the plunger 312 traverses towards or away from the first end 322 and changes the volumes of the chambers created by the secondary plunger 526, hydraulic fluid flows through the channels created by the grooves 512-516. By way of example, the plunger 312 may move away from the first end 322 (e.g., as a result of the vehicle encountering a positive obstacle), and the pressure of the fluid in the chamber between the secondary plunger 526 and the end 322 may decrease. Fluid flow from this chamber may occur through the channel defined by the grooves 512-514 towards the primary plunger 312. The grooves 512-516 may be configured to restrict fluid flow to provide an additional damping force proportional to the pressure difference between the fluids in each of the chambers. Thus, through such a configuration, the secondary plunger 526 provides an additional damping force when the pressure differences are greatest (e.g., when the damper assembly 500 is at the end of a stroke).

As shown in FIG. 7C, the opposite surface grooves 512 are spaced around the circumference of the secondary plunger 526 (e.g., equally, symmetrically, unequally, etc.). As shown in FIG. 7C, each of the opposite surface grooves 512 extends along the opposing surface 529 at an angle relative a radial reference line passing through its center (e.g., each of the opposite surface grooves 512 is non-radial). By way of example, FIG. 7C shows a radial reference line 513 that extends from the axis 515 of the secondary plunger 526 through a center 517 of one of the opposite surface grooves 512.

As shown in FIG. 7C, pairs of the opposite surface grooves 512 define a chord of the circle defined by the outer cylindrical face of the secondary plunger 526. The opposite surface grooves 512 in each pair are aligned along the chord and positioned substantially parallel to one another, according to one embodiment. Because the contact grooves 514 and the inner grooves 516 defining the channels are substantially aligned with the opposite surface grooves 512, such an arrangement facilitates a uniform distribution of flow between the chambers. The distribution of opposite surface grooves 512 is an improvement over only providing a single channel, which may result in lateral forces, rotational forces, and/or wear on the secondary plunger 526, the shaft 338, and/or the plunger 312.

As shown in FIG. 7A, plunger 312 defines a contact surface that is configured to engage the contact surface 527 of secondary plunger 526. According to an exemplary embodiment, the contact surface of plunger 312 and the contact surface 527 of secondary plunger 526 are complementary (i.e., corresponding, matched, correlative, etc.) thereby reducing the risk of pressurized fluid seeping across the contact surfaces of plunger 312 and secondary plunger 526. According to an alternative embodiment, a seal is positioned between plunger 312 and secondary plunger 526.

According to an alternative embodiment, plunger 312 defines a channel. The channel of plunger 312 may correspond to the contact groove 514 of the secondary plunger 526 such that the channel of plunger 312 and the contact groove 514 of secondary plunger 526 together form a flow conduit. In other embodiments, the channel of plunger 312 does not correspond to the contact groove 514 of secondary plunger 526 such that a plurality of flow conduits are formed between the contact groove 514 and the contact surface of plunger 312.

According to an exemplary embodiment, the grooves 512-516 are shaped to dissipate a target amount of energy and/or provide a target supplemental damping force (e.g., due to fluid flow through the conduit). According to an exemplary embodiment, fluid flow does not occur between secondary plunger 526 and the sidewall of housing 314. Secondary plunger 526 (e.g., with a seal disposed in the groove 531) may limit fluid flow to a flow path through the channels defined by grooves 512-516. Recoil damper 510 thereby generates fluid flow paths through the channels, and performance characteristics may be tuned as a function only of the features of the grooves 512-516, according to an exemplary embodiment. Limiting fluid from flowing between secondary plunger 526 and an inner sidewall of housing 314 also provides more predictable and uniform energy dissipation and supplemental damping forces (i.e., additional flow paths may introduce additional variability into the energy dissipated by a limiter).

Figure 8:
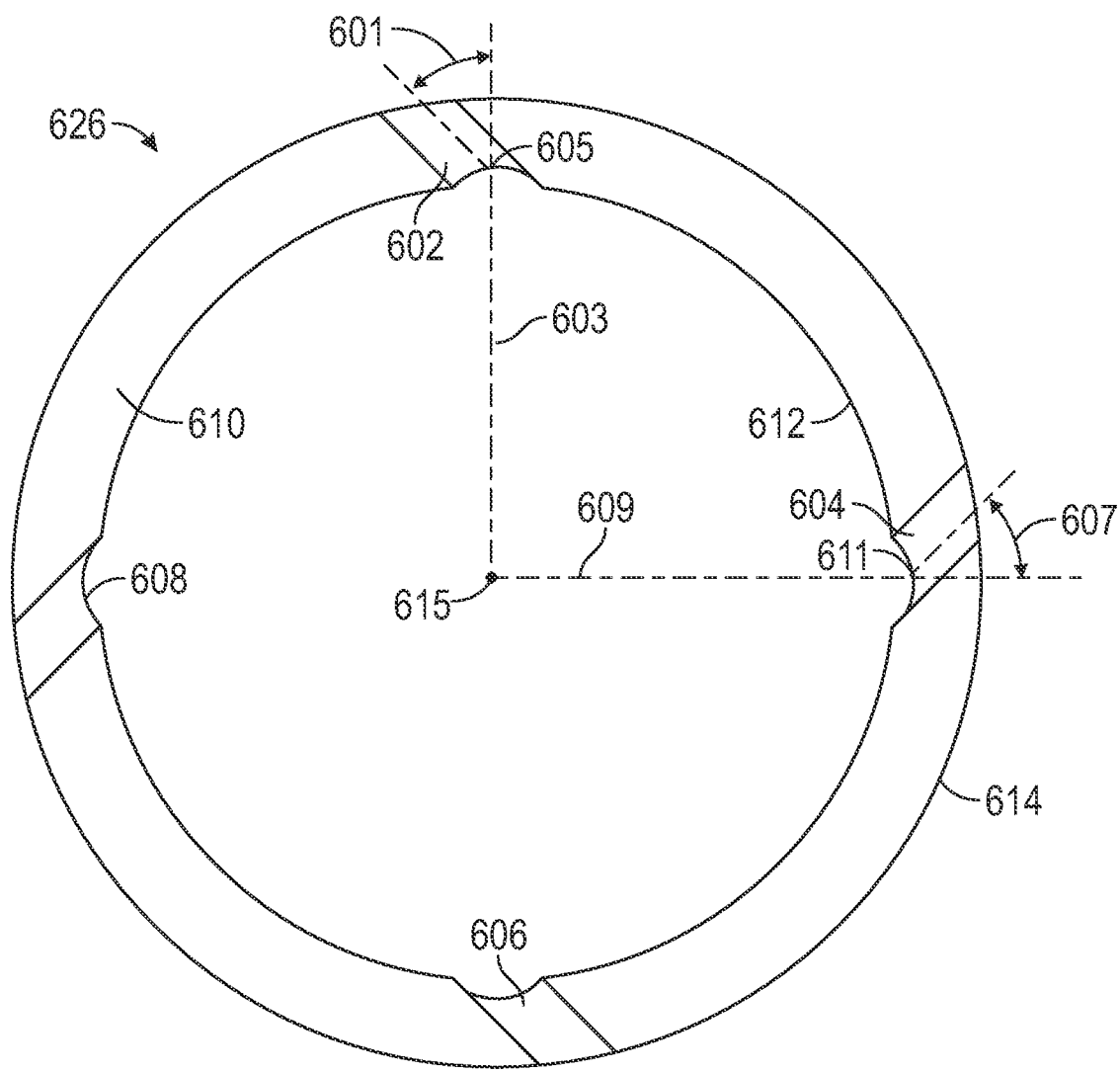
FIG. 8 is a top view of a secondary piston of a damper, according to an exemplary embodiment.

Referring now to FIG. 8, a top view of an alternative secondary plunger 626 is shown, according to an exemplary embodiment. The secondary plunger 626 may be used in place of the secondary plunger 326 and/or the secondary plunger 526. The secondary plunger 626 may share features with the secondary plunger 526 (e.g., grooves on an inner cylindrical face 612 thereof and grooves on a contact surface thereof).

In the example shown, an opposing surface 610 (i.e., a surface of the secondary plunger 626 that is further away from the plunger 312) includes a first groove 602, a second groove 604, a third groove 606, and a fourth groove 608. As shown in FIG. 8, each of the first groove 602, second groove 604, third groove 606, and fourth groove 608 extend along an opposing surface 610 at an angle relative a radial reference line passing through its center (e.g., each of the first groove 602, second groove 604, third groove 606, and fourth groove 608 are non-radial). By way of example, FIG. 8 shows a first angle 601 formed between a first radial reference line 603 that extends from the axis 615 of the secondary plunger 626 and passes through a center 605 of the first groove 602. Similarly, FIG. 8 shows a second angle 607 formed between a second radial reference line 609 that extends from the axis 615 of the secondary plunger 626 and passes through a center 611 of the second groove 604. In the embodiment shown in FIG. 8, the first angle 601 and the second angle 607 are the same. Alternatively they may be different.

As shown in FIG. 8, first ends of the first groove 602 and the third groove 606 are substantially aligned at a first diameter of the circle defined by the inner cylindrical face 612. Additionally, the first groove 602 and the third groove 606 extend away from the first ends, across the entirety of the opposing surface 610, and substantially parallel to one another. Second ends of the grooves 602 and 606 (e.g., ends closer to an outer surface 614 of the secondary plunger 626) are offset from one another. Grooves 602 and 606 may be substantially parallel to one another but on opposing sides of the secondary plunger 626 such that fluid flowing through channels created by the grooves 602 and 606 provides counterbalancing forces on the secondary plunger 626. Rotation of the secondary plunger 626, and resulting wear and tear on any components (e.g., a shaft or return spring) may be reduced (e.g., eliminated, etc.).

First ends of the second groove 604 and the fourth groove 608 are substantially aligned at a second diameter of the circle defined by the inner cylindrical face 612. In one embodiment, the first diameter (the diameter at which first ends of the first and third grooves 602 and 606 are aligned) is perpendicular to the second diameter. The second groove 604 and the fourth groove 608 extend away from the first ends, across the entirety of the opposing surface 610, and substantially parallel to one another. Second ends of the grooves 604 and 608 (e.g., ends closer to an outer surface 614 of the secondary plunger 626) are offset from one another. In one embodiment, the first and third grooves 602 and 606 extend in a direction that is substantially perpendicular to the direction that the second and fourth grooves 604 and 608 extend. The second groove 604 and the fourth groove 608 may be substantially parallel to one another but on opposing sides of the secondary plunger 626 such that fluid flowing through channels created by the grooves 604 and 608 provides counterbalancing forces on the secondary plunger 626. Rotation of the secondary plunger 626, and resulting wear and tear on any components (e.g., a shaft or return spring) may be reduced (e.g., eliminated, etc.).

As shown in FIG. 8, around the circumference of the secondary plunger 626, there are grooves of alternating orientations. The grooves may be substantially perpendicular to one another. Such grooves further facilitate the counterbalancing of directional forces placed on the secondary plunger 626 by fluid flow. In an exemplary embodiment, the secondary plunger 626 also includes grooves on a contact surface thereof (e.g., a surface opposite to the opposing surface 610). The grooves may be similar to the grooves 514 and may establish a fluid conduit with the plunger 312. In one such embodiment, the grooves on the contact surface are directly below each of the grooves 602-608 and substantially parallel to the grooves 602-608.

Returning now to FIG. 4, the recoil damper 236 of the integrated spring damper 200 includes a recoil piston 238 positioned within the second chamber 228 and a resilient member such as an interlaced wave spring (i.e., a flat wire compression spring), a coil spring, or another type of spring. The resilient member may be disposed between the recoil piston 238 and the barrier 206. According to an exemplary embodiment, the resilient member is not intended to damp the movement of the main piston 224 but positions the recoil piston 238 within the main body 202, such as after it has been displaced by the main piston 224. In other embodiments, the recoil damper 236 may not include a resilient member and the recoil piston 238 may be repositioned using gravity or an alternative device.

Occupants within a vehicle experience large impulse forces as the main piston 224 contacts the barrier 206 or a component of the suspension system engages a hard stop. The recoil damper 236 reduces such impulse forces transmitted to occupants within the vehicle by dissipating a portion of the kinetic energy of the main piston 224 and the main tube 216 (i.e., provide a supplemental damping force) as the integrated spring damper assembly 200 reaches an end of stroke (e.g., as the piston reaches a recoil end of stroke, as the piston reaches a jounce end of stroke, etc.).

The first chamber 226, the second chamber 228, and the first inner chamber 232 contain a generally non-compressible fluid (e.g., hydraulic fluid, oil, etc.). The first inner chamber 232 is in fluid communication with the first chamber 226 through an opening 225 in the main piston 224. The fluid may flow between the first chamber 226 and the second chamber 228 through a passage 242 (e.g., conduit, bore, etc.) in a bypass manifold 240. According to an exemplary embodiment, the bypass manifold 240 is a structure coupled to the side of the main body 202. The passage 242 is in fluid communication with the first chamber 226 through an aperture 244 in the main body 202 and with the second chamber 228 through an aperture 246 in the main body 202. According to an exemplary embodiment, the aperture 246 opens into the second chamber 228 between the main piston 224 and the recoil piston 238. The flow of fluid through the passage 242 is controlled by a flow control device 248. According to an exemplary embodiment, the flow control device 248 is a disk valve disposed within the bypass manifold 240 along the passage 242. In other embodiments, the flow control device 248 may be another device, such as a pop off valve, or an orifice. In other embodiments, the flow control device remotely positioned but in fluid communication with the first chamber 226 and the second chamber 228.

The second inner chamber 234 contains a generally compressible fluid that may include (e.g., at least 90%, at least 95%) an inert gas such as nitrogen, argon, or helium, among others. In some embodiments, the second inner chamber 234 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper assembly 200 is compressed or extended, the main tube 216 translates relative to the main body 202. The gas held in the second inner chamber 234 compresses or expands in response to relative movement between the main tube 216 and the dividing piston 230, which may remain relatively stationary but transmit pressure variations between the incompressible hydraulic fluid in the first inner chamber 232 and the compressible fluid in second inner chamber 234. The gas in the second inner chamber 234 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper assembly 200.

Movement of the main tube 216 relative to the main body 202 translates the main piston 224, causing the volume of the first chamber 226 and the second chamber 228 to vary. When the integrated spring damper assembly 200 compresses, the volume of the first chamber 226 decreases while the volume of the second chamber 228 increases. The fluid is forced from the first chamber 226 through the passage 242 and past the flow control device 248 into the second chamber 228. The resistance to the flow of the fluid through the passage 242 provides a damping function for the integrated spring damper assembly 200 that is independent of the spring function.

Figure 9A:
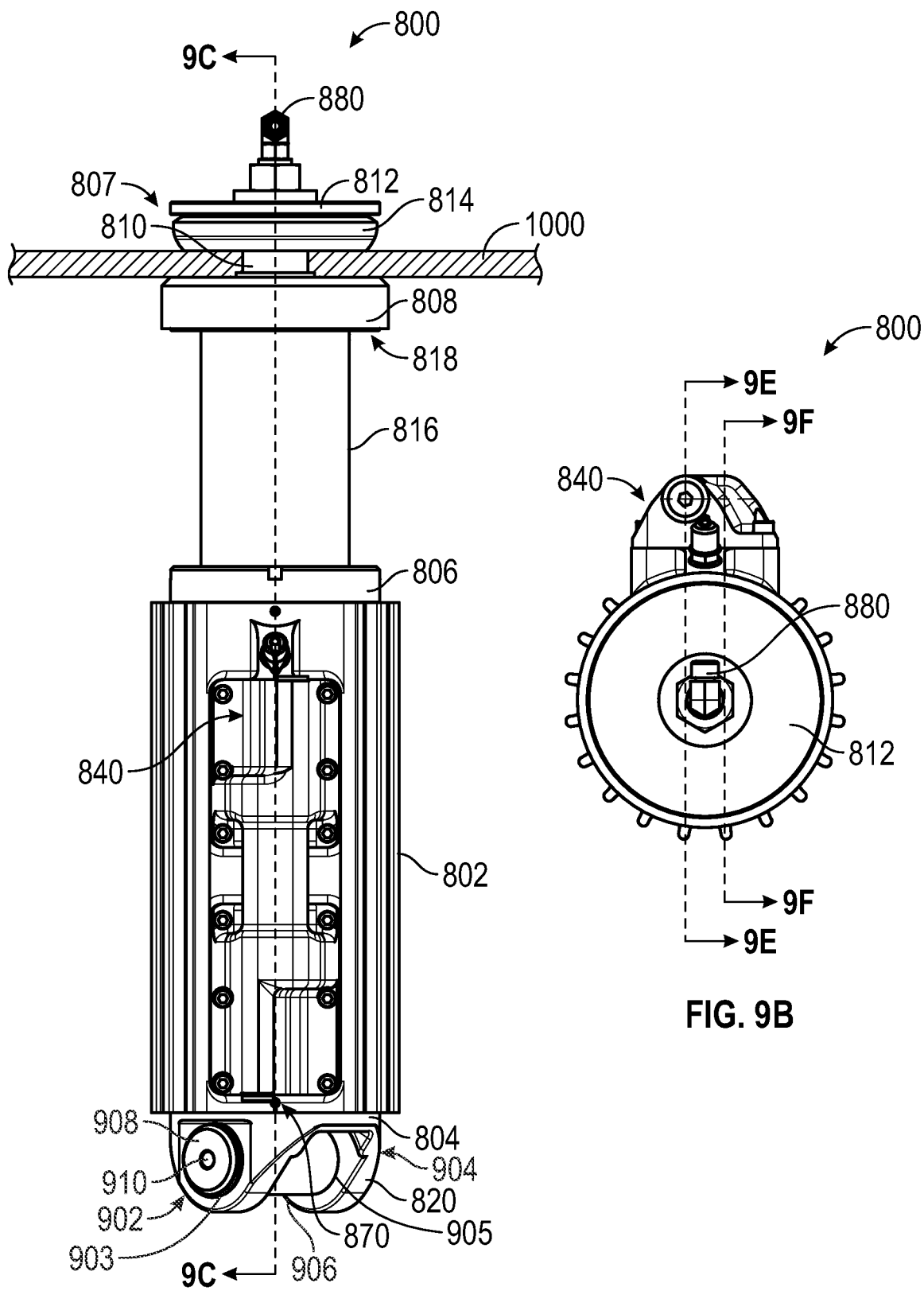
FIG. 9A is a side view of a suspension element, according to an alternative embodiment.
Figure 9B:
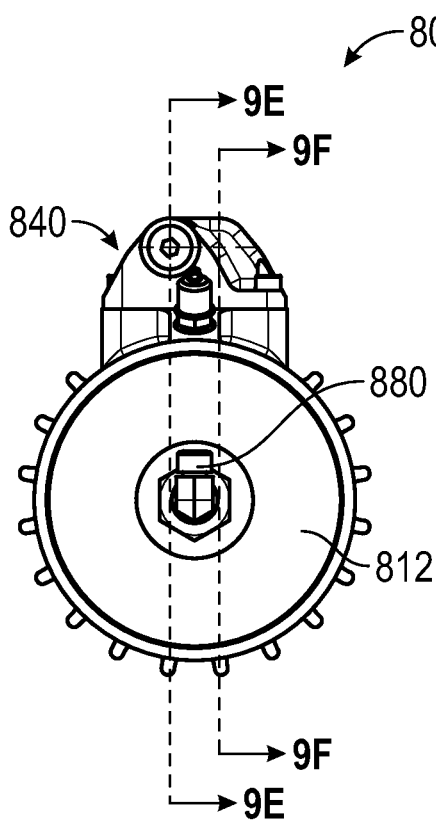
FIG. 9B is a top view of the suspension element of FIG. 9A.
Figure 9C:
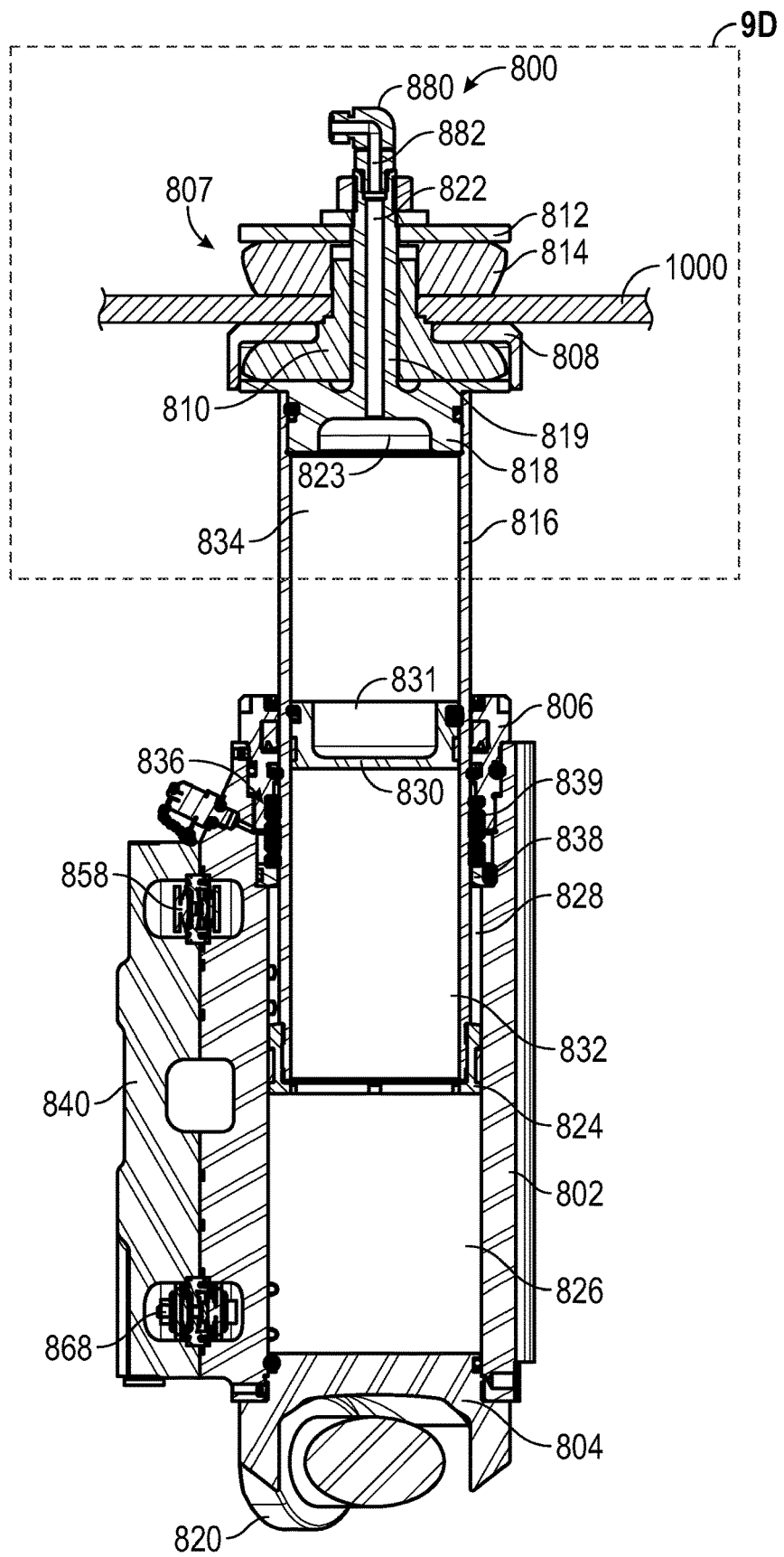
FIG. 9C is a sectional view of the suspension element of FIG. 9A.

Referring to FIGS. 9A-9F, an integrated spring damper 800 is shown, according to another exemplary embodiment. As shown in FIG. 9A, the integrated spring damper 800 includes a tubular element (e.g., cylindrical, etc.), shown as main body 802. In one embodiment, the main body 802 is manufactured using an extrusion process. In an alternative embodiment, the main body 802 is manufactured using a casting process. As shown in FIGS. 9A and 9C, a cap, shown as cap 804, and a barrier, shown as barrier 806, are disposed on opposing ends of the main body 802, defining an internal volume. The integrated spring damper 800 further includes a tubular element (e.g., cylindrical, etc.), shown as main tube 816. The main tube 816 is at least partially received within the internal volume of the main body 802. The main tube 816 is configured to translate with respect to the main body 802. As shown in FIG. 9C, a cap, shown as cap 818, is disposed at a distal end of the main tube 816. The cap 804, barrier 806, and cap 818 may be coupled to the respective components with a threaded connection or with another coupling mechanism (e.g., welding, a friction weld, brazing, interference fit, etc.). As shown in FIG. 9A, in some embodiments, the integrated spring damper 800 includes a locking mechanism, shown as locking mechanism 870. In one embodiment, the locking mechanism 870 is configured to position (e.g., lock, index, etc.) the cap 804 in a target orientation relative to the main body 802. In one embodiment, the locking mechanism 870 includes a set screw that is tightened to facilitate locking the cap 804 in the target orientation. The locking mechanism 870 may facilitate indexing a lower mount of the integrated spring damper 800 relative to other components thereof and thereby facilitate mounting integrated spring damper 800 onto a vehicle.

According to an exemplary embodiment, the integrated spring damper 800 includes a first mounting portion (e.g., a lower mounting portion, etc.), shown as eyelet 820, with which the integrated spring damper 800 is coupled to one portion of an axle assembly (e.g., a lower portion of the axle assembly, etc.). According to an exemplary embodiment, the integrated spring damper 800 is coupled on one end (e.g., with the eyelet 820 on a lower end, etc.) to a moveable member of the axle assembly (e.g., a lower support arm, etc.). According to an exemplary embodiment, the eyelet 820 is integrally formed with the cap 804. As shown in FIG. 9A, the integrated spring damper 800 includes a second mounting portion (e.g., an upper mounting portion, a pin mount, etc.), shown as upper mount 807. The upper mount 807 is configured to couple an opposing second end (e.g., an upper end, etc.) of the integrated spring damper 800 to a vehicle structural element, vehicle body, frame member, or part thereof (e.g., chassis, side plate, hull, etc.), shown as side plate 1000.

According to an exemplary embodiment, the eyelet 820 includes a first ear 902 and a second ear 904. In the embodiment shown, the first ear 902 includes a first opening 903 (also see FIG. 10A) and the second ear 904 includes a second opening 905 (also see FIG. 10A). The first and second openings are circular and of the same diameter. It should be understood that, in various alternative embodiments, the openings may be shaped differently or differently from one another. In the embodiment shown, the openings in the first and second ears 902 and 904 are aligned with one another to facilitate the insertion of a mounting pin 906 therethrough.

In the embodiment shown, the mounting pin 906 is substantially cylindrical in shape. In one embodiment, the length of the mounting pin 906 is greater than a distance between outer surfaces of the first and second ears 902 and 904. With the mounting pin 906 inserted and centered, a first end 908 of the mounting pin 906 extends outwardly from the first ear 902. Additionally, a second end of the mounting pin 906 extends outwardly from the second ear 904. As described below with respect to FIGS. 10A-10I, in addition to being inserted into the ears 902 and 904 of the eyelet 820, the mounting pin 906 is also inserted through an element (e.g., a swing arm, etc.) that is coupled to an axle assembly of a vehicle to rotatably couple the integrated spring damper 800 to the axle assembly. In some embodiments, the mounting pin 906 includes an opening that extends from the first end to the second end.

Figure 9D:
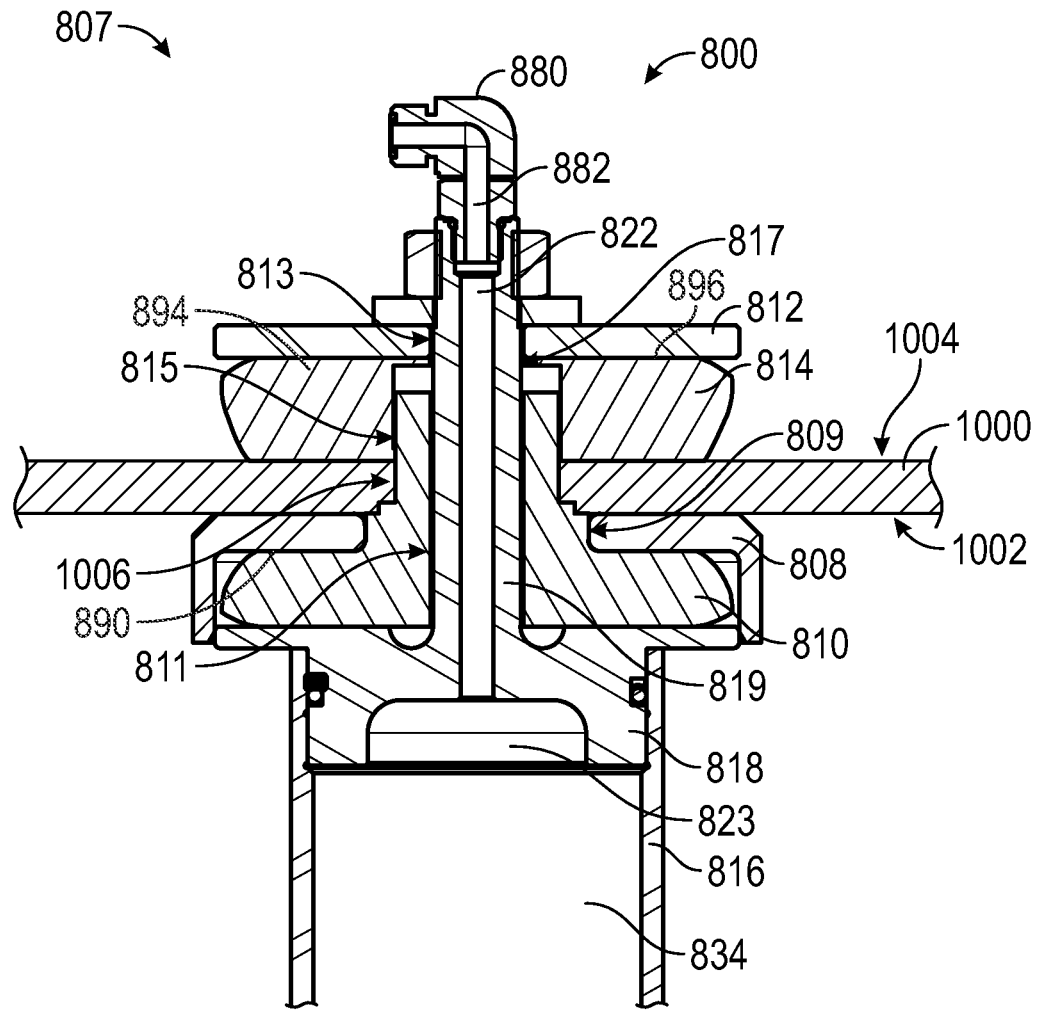
FIG. 9D is a detailed view of an upper mount of the suspension element of FIG. 9C.

As shown in FIGS. 9A and 9C-9D, the upper mount 807 includes a first mounting member 808, a second mounting member 810, a third mounting member 812, and a fourth mounting member 814. As shown in FIGS. 9A and 9D, the first mounting member 808 is disposed proximal the cap 818 and positioned such that an upper surface of the first mounting member 808 abuts a first surface of the side plate 1000, shown as bottom surface 1002. In one embodiment, the first mounting member 808 is constructed from a metal or wear resistant material. As shown in FIG. 9C-9D, the second mounting member 810 includes a portion (e.g., a lower portion, a first portion, a non-protruded portion, etc.) that is positioned proximal both the first mounting member 808 and the cap 818. Specifically, the second mounting member 810 is positioned between the cap 818 and the first mounting member 808. In one embodiment, the second mounting member 810 is a resilient member, such as a flexible urethane, that serves as an isolator and an elastomeric spacer. The second mounting member 810 may be configured to isolate the cap 818 from at least one of the first mounting member 808 and the side plate 1000. In some embodiments, the first mounting member 808 and the second mounting member 810 are annular and circular in shape. In other embodiments, the first mounting member 808 and the second mounting member 810 have another shape (e.g., discus square, hexagonal, etc.).

In some embodiments, the first mounting member 808 is friction welded to the second mounting member 810. For example, planar portions of the surface of the first mounting member 808 that are to be disposed nearest the cap 818 may be forced against planar portions of the surface of the second mounting member 810 that is to be disposed nearest a side plate 1000. Rotational energy may be applied to at least one of the first mounting member 808 and the second mounting member 810 while the mounting members 808 and 810 are pressed against one another until friction welds 890 and 892 join the mounting members 808 and 810 together. In one embodiment, the first and second mounting members 808 and 810 are substantially circular and define apertures 809 and 811 through which a protruding portion 819 of the cap 818 extends. The friction welds 890 and 892 may circumferentially surround the aperture 809.

As shown in FIGS. 9A and 9D, the fourth mounting member 814 is positioned between the side plate 1000 and the third mounting member 812. A second surface, shown as top surface 1004, of the side plate 1000 is in contact with a bottom surface of the fourth mounting member 814, and the third mounting member 812 is disposed on a top surface of the fourth mounting member 814. The first mounting member 808 and the fourth mounting member 814 are spaced to receive the side plate 1000. In one embodiment, the fourth mounting member 814 is a resilient member, such as a flexible urethane, that serves as an isolator and an elastomeric spacer. The fourth mounting member 814 may be configured to isolate the third mounting member 812 from the side plate 1000. In one embodiment, the third mounting member 812 is constructed from a metal or wear resistant material. In some embodiments, the third mounting member 812 and the fourth mounting member 814 are annular and circular in shape. In other embodiments, the third mounting member 812 and the fourth mounting member 814 have another shape (e.g., discus square, hexagonal, etc.).

In some embodiments, the fourth mounting member 814 is friction welded to the third mounting member 812. For example, planar portions of a surface of the third mounting member 812 may be forced against planar portions of a surface of the fourth mounting member 814. Rotational energy may be applied to at least one of the third mounting member 812 and the fourth mounting member 814 while the mounting members 812 and 814 are pressed against one another until friction welds 894 and 896 join the mounting members 812 and 814 together. In one embodiment, the third and fourth mounting members 812 and 814 are substantially circular and define apertures 813 and 817 through which a protruding portion 819 of the cap 818 extends. The friction welds 894 and 896 may circumferentially surround the apertures 813 and 817.

As shown in FIG. 9D, the first mounting member 808 defines an aperture, shown as first member aperture 809, that corresponds with (e.g., aligns with, cooperates with, etc.) an aperture defined by side plate 1000, shown as locating aperture 1006. The second mounting member 810 includes a protruded portion (e.g., a second portion, an upper portion, etc.) that extends through the first aperture 809 and the locating aperture 1006 and is engaged with a recess, shown as recess 815, defined by the fourth mounting member 814. In one embodiment, the recess 815 receives the protruded portion of the second mounting member 810. The second mounting member 810 defines an aperture, shown as second member aperture 811, that extends longitudinally through the second mounting member 810 and aligns with (e.g., cooperates with, etc.) an aperture, shown as third member aperture 813, and an aperture, shown as fourth member aperture 817, defined by the third mounting member 812 and the fourth mounting member 814, respectively. The second member aperture 811, third member aperture 813, and fourth member aperture 817 receive a cap protrusion 819 (e.g., a protruded portion 819 of the cap 818).

As shown in FIG. 9C, a main piston, shown as main piston 824, is disposed in the internal volume of the main body 802. The main piston 824 is coupled to the main tube 816 and slidably engages the main body 802. The main piston 824 separates the internal volume into a first chamber 826 (e.g., compression chamber, etc.) and a second chamber 828 (e.g., extension chamber, etc.). The first chamber 826 is a generally cylindrical chamber that includes the portion of the internal volume of the main body 802 between the main piston 824 and the cap 804. The second chamber 828 is an annular chamber defined between the main body 802 and the main tube 816 and extends between the main piston 824 and the barrier 806. When the main tube 816 translates relative to the main body 802, the main piston 824 changes the volume of the first chamber 826 and the second chamber 828. A dividing piston, shown as dividing piston 830 (e.g., floating piston, etc.), is disposed in the main tube 816 and slidably engages the main tube 816. The dividing piston 830 separates the internal volume of the main tube 816 into a first inner chamber 832 and a second inner chamber 834. According to an exemplary embodiment, the first inner chamber 832 is open to (i.e., in fluid communication with, etc.) the first chamber 826.

According to an exemplary embodiment, the first chamber 826, the second chamber 828, and the first inner chamber 832 contain a generally non-compressible fluid (e.g., hydraulic fluid, oil, etc.). According to an exemplary embodiment, the second inner chamber 834 contains a generally compressible fluid that may include (e.g., at least 90%, at least 95%) an inert gas such as nitrogen, argon, or helium, among others. In some embodiments, the second inner chamber 834 is in fluid communication with external devices, such as one or more reservoirs (e.g., central reservoir, tank, etc.), an accumulator, or a device allowing the pressure of the gas to be adjusted with a pressure regulation line. The pressure of the gas may be adjusted by removing or adding a volume of gas to adjust the suspension ride height.

According to an exemplary embodiment, the integrated spring damper 800 includes a pressure regulation line that is located at a top portion (e.g., a top end, an upper end, etc.) of the integrated spring damper 800. As shown in FIGS. 9A-9D, the integrated spring damper 800 includes a port, shown as pressure regulation port 880, coupled to the protruded portion 819 of the cap 818 (e.g., with a threaded interface, welded, etc.). As shown in FIGS. 9C-9D, the pressure regulation port 880 defines a passageway, shown as inlet passageway 882. The protruded portion 819 of the cap 818 defines a passageway, shown as intermediate passageway 822. The intermediate passageway 822 cooperates with the inlet passageway 882 to define the pressure regulation line of the integrated spring damper 800. The pressure regulation line extends from the pressure regulation port 880, through the protruded portion 819 of the cap 818, and into the second inner chamber 834 of the main tube 816 such that it is fluidly connected to the second inner chamber 834. According to an exemplary embodiment, the pressure regulation line of the integrated spring damper 800 facilitates increasing or decreasing a volume of fluid (e.g., an inert gas, etc.) within the second inner chamber 834 of the main tube 816.

According to an exemplary embodiment, the pressure regulation port 880 is positioned at the top of the integrated spring damper 800 to provide a fixed or static location to fill or release gas from the second inner chamber 834 of the integrated spring damper 800. The pressure regulation port 880 is positioned to increase (e.g., maximize, etc.) the travel of the main tube 816 within the main body 802, thereby increasing the stroke of the integrated spring damper 800. By way of example, impulse forces transmitted to occupants within a vehicle from bumps, pot holes, etc. may be reduced by increasing the maximum stroke of the integrated spring damper 800. According to an exemplary embodiment, the pressure regulation port 880 is positioned above the side plate 1000 to reduce the risk of debris (e.g., dirt, rocks, mud, etc.) damaging or blocking the pressure regulation port 880.

When the integrated spring damper 800 is compressed or extended, the main tube 816 translates relative to the main body 802. The gas held in the second inner chamber 834 compresses or expands in response to relative movement between the main tube 816 and the dividing piston 830, which may remain relatively stationary but transmit pressure variations between the incompressible hydraulic fluid in the first inner chamber 832 and the compressible fluid in second inner chamber 834. The gas in the second inner chamber 834 resists compression, providing a force that is a function of the compressibility of the gas, the area of the piston, the volume and geometry of the second inner chamber 834, and the current state (e.g., initial pressure, etc.) of the gas, among other factors. The receipt of potential energy as the gas is compressed, storage of potential energy, and release of potential energy as the gas expands provide a spring function for the integrated spring damper 800.

In one embodiment, a recessed area is disposed in the dividing piston 830. In FIG. 9C the recessed area is shown as cup 831. According to the exemplary embodiment shown in FIG. 9C, the dividing piston 830 is positioned such that the cup 831 facilitates an increase in the volume of the second inner chamber 834. In other embodiments, the dividing piston 830 is positioned such that the cup 831 facilitates an increase in the volume of the first inner chamber 832. The dividing piston 830 may be flipped and repositioned to selectively increase the volume of the first inner chamber 832 or the second inner chamber 834 to tune the performance of the integrated spring damper 800. As shown in FIG. 9C, the cap 818 defines a pocket, shown as cap pocket 823. The cap pocket 823 is structured to increase the volume of the second inner chamber 834. In some embodiments, the cap pocket 823 and the cup 831 increase the volume of the second inner chamber 834. In other embodiments, at least one of the cap pocket 823 and the cup 831 are not defined by the cap 818 and the dividing piston 830, respectively. By way of example, increasing the volume of the second inner chamber 834 (i.e., decreasing the gas pressure within the second inner chamber 834, etc.) may facilitate a softer ride (e.g., a smaller spring force, etc.), while decreasing the volume of the second inner chamber 834 (i.e., increasing the gas pressure within the second inner chamber 834, etc.) may facilitate a stiffer ride (e.g., a greater spring force, etc.).

Referring again to FIG. 9C, a limiter, shown as recoil damper 836, is disposed within the internal volume of the main body 802, between the main piston 824 and the barrier 806. The recoil damper 836 reduces the risk of damage to the main piston 824, barrier 806, the sidewall of main body 802, and still other components of integrated spring damper 800 by reducing the forces imparted by the main piston 824 as it travels toward an end of stroke (i.e., the maximum travel of the stroke, etc.). According to an exemplary embodiment, the recoil damper 836 includes a recoil piston, shown as recoil piston 838, positioned within the second chamber 828 and a resilient member, shown as resilient member 839. The resilient member 839 may include an interlaced wave spring (i.e., a flat wire compression spring, etc.), a coil spring, or another type of spring. The resilient member 839 may be disposed between the recoil piston 838 and the barrier 806. According to an exemplary embodiment, the resilient member 839 is not intended to substantially resist the movement of the main piston 824 but positions the recoil piston 838 within the main body 802, such as after it has been displaced by the main piston 824. In other embodiments, the recoil damper 836 does not include a resilient member, and the recoil piston 838 may be repositioned using gravity or an alternative device.

Occupants within a vehicle experience large impulse forces as the main piston 824 contacts the barrier 806 or a component of the suspension system engages a hard stop. The recoil damper 836 reduces such impulse forces transmitted to occupants within the vehicle by dissipating a portion of the kinetic energy of the main piston 824 and the main tube 816 (i.e., provide a supplemental damping force, etc.) as the integrated spring damper 800 reaches an end of stroke (e.g., as the piston reaches a recoil end of stroke, as the piston reaches a jounce end of stroke, etc.).

Figure 9E:
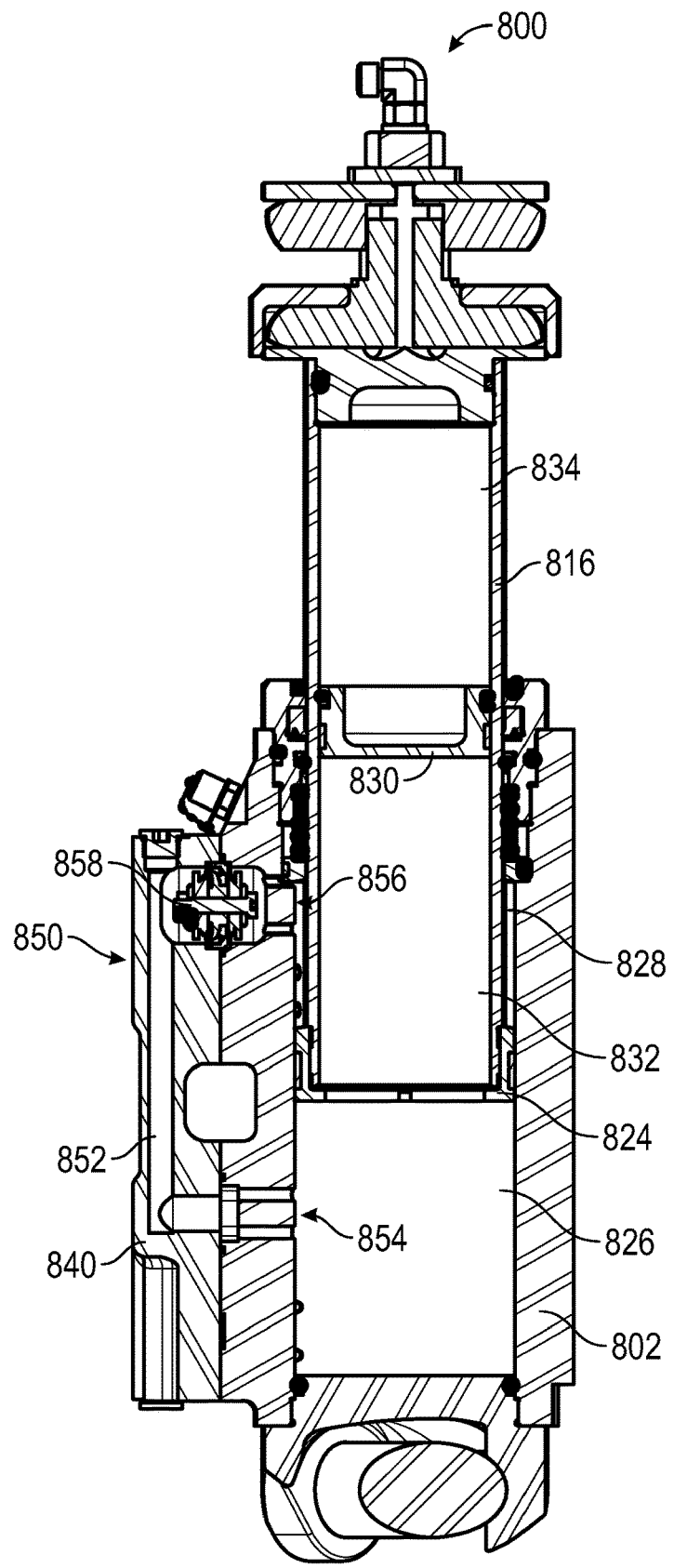
FIG. 9E is sectional view of the suspension element of FIG. 9B.
Figure 9F:
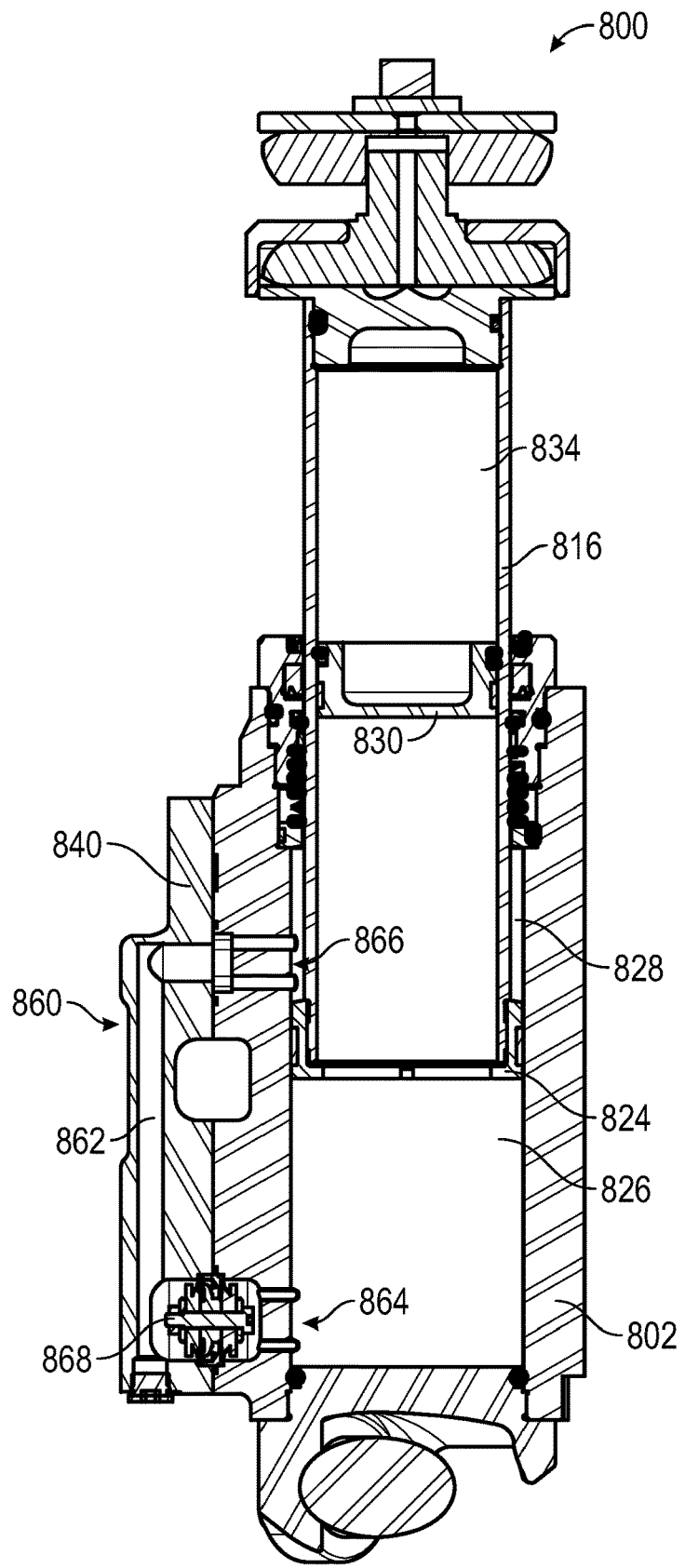
FIG. 9F is another sectional view of the suspension element of FIG. 9B.

Referring now to FIGS. 9E-9F, the first chamber 826 and the second chamber 828 are fluidly connected (e.g., such that fluid may flow between them) through at least one of a first passage 852 (e.g., conduit, bore, etc.) of a flow path, shown as first flow path 850, defined by a manifold, shown as bypass manifold 840, and a second passage 862 of a flow path, shown as second flow path 860, also defined by bypass manifold 840. In other embodiments, the bypass manifold 840 defines a different number of passages (e.g., one, three, etc.). According to an exemplary embodiment, the bypass manifold 840 is coupled to the side of the main body 802 (e.g., removably coupled to the main body 802 with a plurality of fasteners, etc.). In other embodiments, the bypass manifold 840 and the main body 802 are integrally formed (e.g., a unitary structure, etc.). According to an alternative embodiment, at least one of the first passage 852 and the second passage 862 are formed with tubular members coupled to an outer portion of the main body 802 or with flow passages defined by the main body 802.

According to the exemplary embodiment shown in FIGS. 9C and 9E-9F, damping forces are generated as the flow of fluid through the first passage 852 and the second passage 862 interacts with flow control elements, shown as first flow control device 858 and second flow control device 868. According to an exemplary embodiment, the first flow control device 858 and the second flow control device 868 are bidirectional flow valves disposed within the bypass manifold 840 along the first passage 852 and the second passage 862, respectively. The first flow control device 858 and the second flow control device 868 may include washers that differentially restrict a fluid flow based on the direction that the fluid is flowing. In other embodiments, the first flow control device 858 and the second flow control device 868 are other types of flow control device, such as pop off valves or orifices (e.g., variable flow orifices, etc.). In other embodiments, the first flow control device 858 and the second flow control device 868 are remotely positioned but in fluid communication with the first chamber 826 and the second chamber 828.

According to an exemplary embodiment, the main body 802 defines a plurality of sets of openings. As shown in FIG. 9E, the plurality of sets of openings include a first set having openings 854 and openings 856. The openings 854 and the openings 856 are fluidly coupled by the first passage 852. As shown in FIG. 9F, the plurality of sets of openings include a second set having openings 864 and openings 866. The openings 864 and the openings 866 are fluidly coupled by the second passage 862. According to an exemplary embodiment, the first passage 852 and the second passage 862 are offset relative to one another both circumferentially and longitudinally along the length of the main body 802 and the bypass manifold 840. In other embodiments, the main body 802 defines a different number of sets of openings (e.g., one, three, four, etc.), each set corresponding with one of the passages defined by the bypass manifold 840.

According to an exemplary embodiment, the integrated spring damper 800 provides different damping forces in extension and retraction and also damping forces that vary based on the position of the main piston 824 relative to the main body 802 (e.g., position dependent dampening, etc.). According to an exemplary embodiment, the integrated spring damper 800 provides recoil damping forces in jounce and compression damping forces in recoil as part of a spring force compensation strategy. By way of example, the position dependent dampening of the integrated spring damper 800 may function as follows. As the main piston 824 translates within main body 802 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 824 within the main body 802.

Movement of the main tube 816 relative to the main body 802 translates the main piston 824, causing the volume of the first chamber 826 and the second chamber 828 to vary. When the integrated spring damper 800 compresses, the volume of the first chamber 826 decreases while the volume of the second chamber 828 increases. The fluid is forced from the first chamber 826 through at least one of the openings 854 of the first passage 852 and the openings 864 of the second passage 862 (e.g., based on the position of the main piston 824 within the main body 802, etc.). The fluid flows through at least one the first passage 852 and the second passage 862 past the first flow control device 858 and the second flow control device 868 and out of the openings 856 and the openings 866 into the second chamber 828. The resistance to the flow of the fluid along at least one of the first passage 852 and the second passage 862 and the interaction thereof with the first flow control device 858 and the second flow control device 868 provides a damping function for the integrated spring damper 800 that is independent of the spring function. By way of example, if the non-compressible fluid is able to flow through both the first passage 852 and the second passage 862, the dampening provided by the integrated spring damper 800 will be less than if fluid is able to flow through only one of the first passage 852 and the second passage 862. Therefore, as the main piston 824 moves towards the cap 804, the integrated spring damper 800 provides a first dampening characteristic (e.g., less dampening, etc.) when the openings 854 and the openings 864 are active and a second dampening characteristics (e.g., more dampening, etc.) when only the openings 864 are active (e.g., because the main piston 824 deactivates the openings 854, which may include the openings 854 being positioned within the second chamber 828, etc.).

Referring now to FIGS. 10A-10I, an integrated spring damper, shown as the integrated spring damper 800, may be rotatably connected to a movable member, shown as a lower support arm 920, of an axle assembly of a vehicle.

Figure 10A:
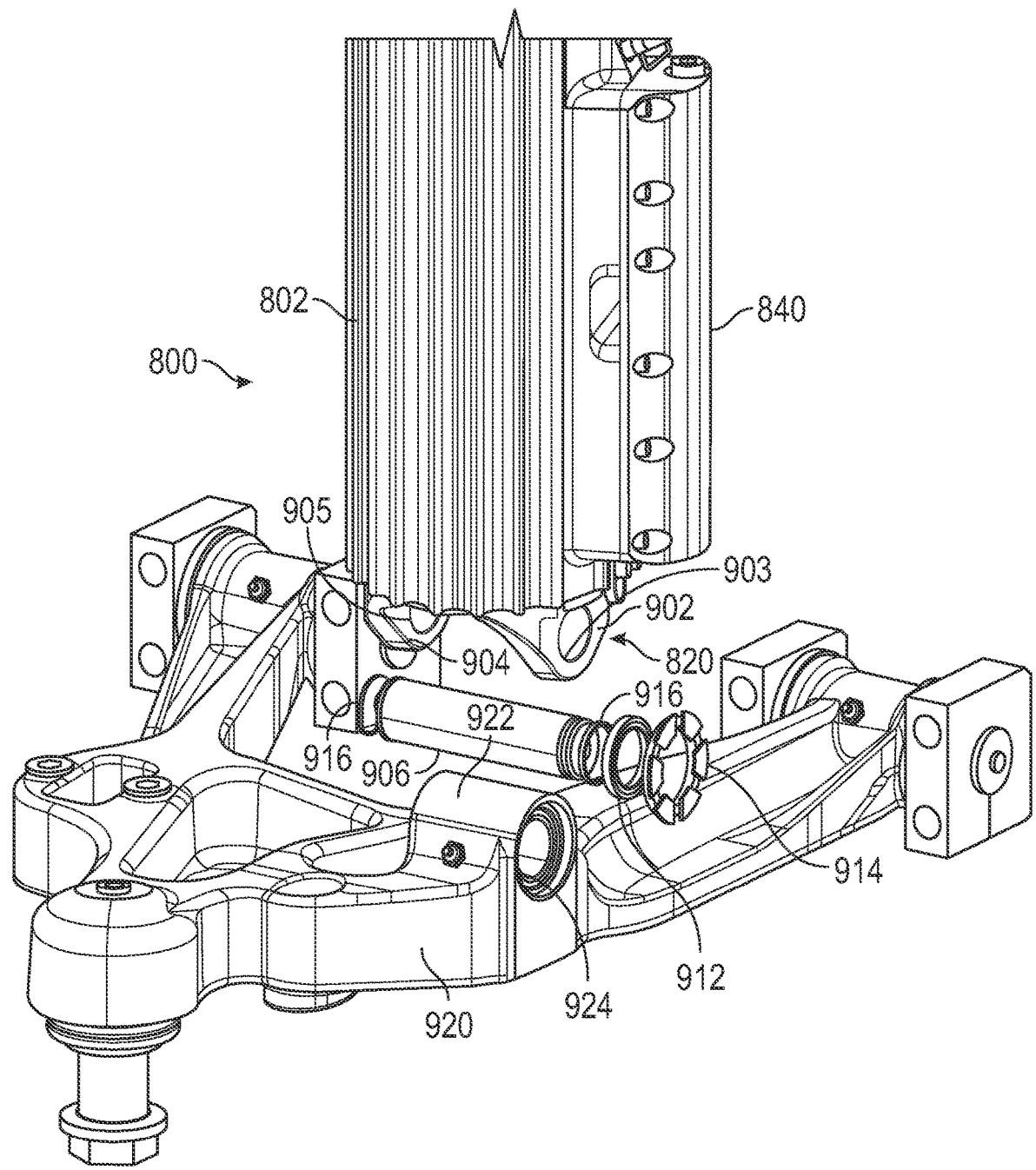
FIG. 10A is an elevated side view of a suspension element and a mounting structure, according to an exemplary embodiment.
Figure 10B:
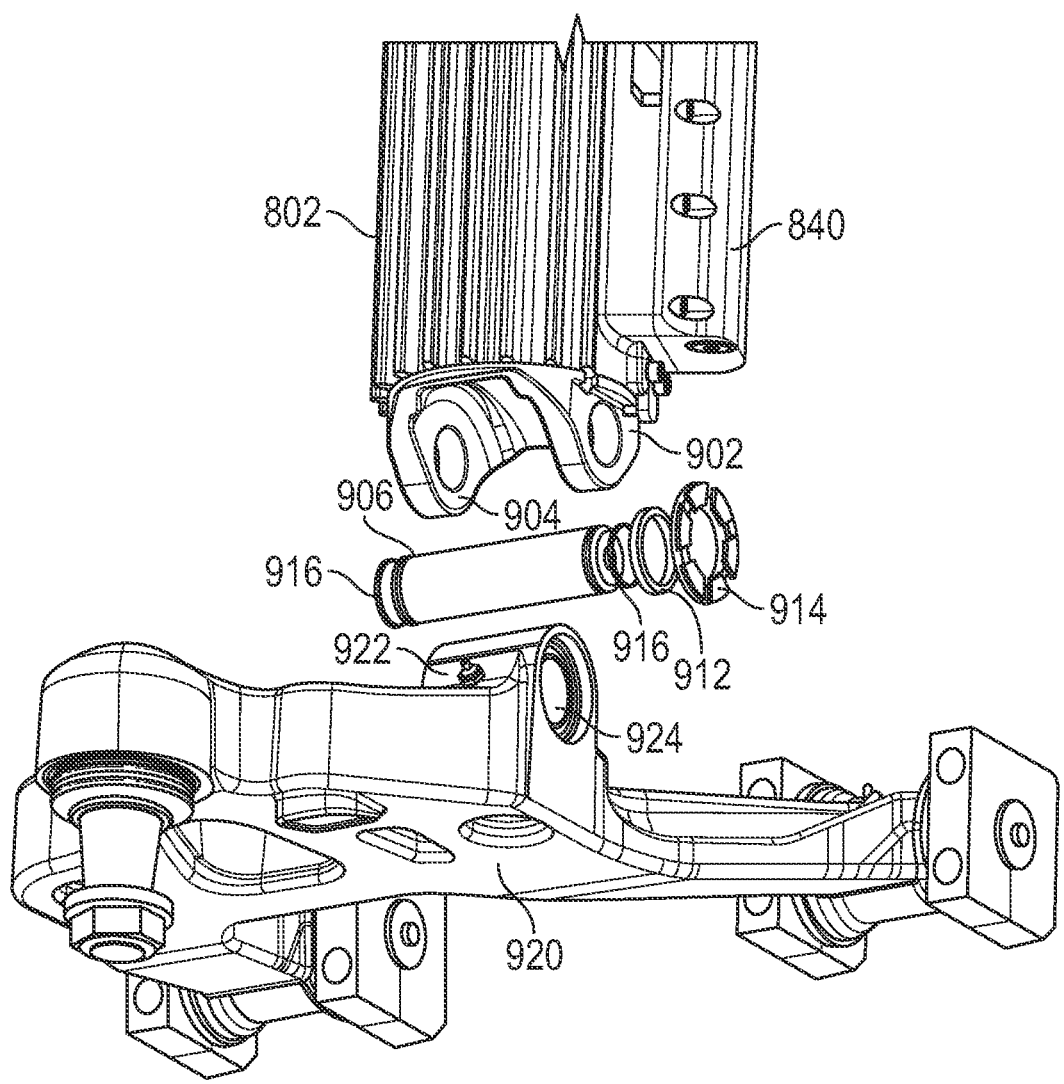
FIG. 10B is a lower view of the suspension element and mounting structure of FIG. 10A.

As shown in FIGS. 10A and 10B, the integrated spring damper 800 includes a main body, shown as the main body 802, a bypass manifold, shown as the bypass manifold 840, and an eyelet, shown as the eyelet 820. The eyelet 820 includes a first ear 902 and a second ear 904, with each of the ears 902 and 904 including openings structured to receive a coupling device, shown as a mounting pin 906. In the example shown, the mounting pin 906 is substantially-cylindrical in shape.

The ears 902 and 904 of the eyelet 820 may be spaced apart such that the distance between surfaces thereof is approximately equal to the width of a mounting portion 922 of the lower support arm 920. The mounting portion 922 is substantially-cylindrical in shape and may be integrated with the lower support arm 920 or separately attached to the lower support arm 920. The mounting portion 922 includes a substantially-cylindrical passage 924. The mounting portion 922 is configured to receive the mounting pin 906 through the passage 924.

In one embodiment, the mounting pin rotatably couples the integrated spring damper 800 to the lower support arm 920, combinations of thrust washers 914 and seals 912 are inserted into ends of the mounting portion 922. In one embodiment, the seals 912 are annular and include an inner diameter that is approximately equal to the diameter of the mounting pin 906. The ears 902 and 904 may then be aligned with the passage 924 of the mounting portion 922. The mounting pin 906 may then be inserted through one of the openings in one of the ears 902 and 904, through a combination of a thrust washer 914 and a seal 912, through the passage 924 of the mounting portion 922, through a combination of another thrust washer 914 and another seal 912, and finally through the other one of the openings in one of the ears 902 and 904. In the embodiment shown in FIGS. 10A-10C, the seal 912 and thrust washer 914 from one end of the passage are removed to simplify illustration (refer to FIGS. 10D-10F, which include the seals 912 and thrust washers 914 on both ends). In one embodiment, fasteners 916 are inserted between the seals 912 and the mounting portion 922 to reduce the risk of the mounting pin 906 rotating with respect to the lower support arm 920. This way, the coupling of the integrated spring damper 800 to lower support arm 920 remains secure. In response to the vehicle encountering an obstacle (e.g., a bump), the integrated spring damper 800 may be configured to rotate with respect to the lower support arm 920 because the ears 902 and 904 are not restrictively coupled to the mounting pin 906.

Figure 10C:
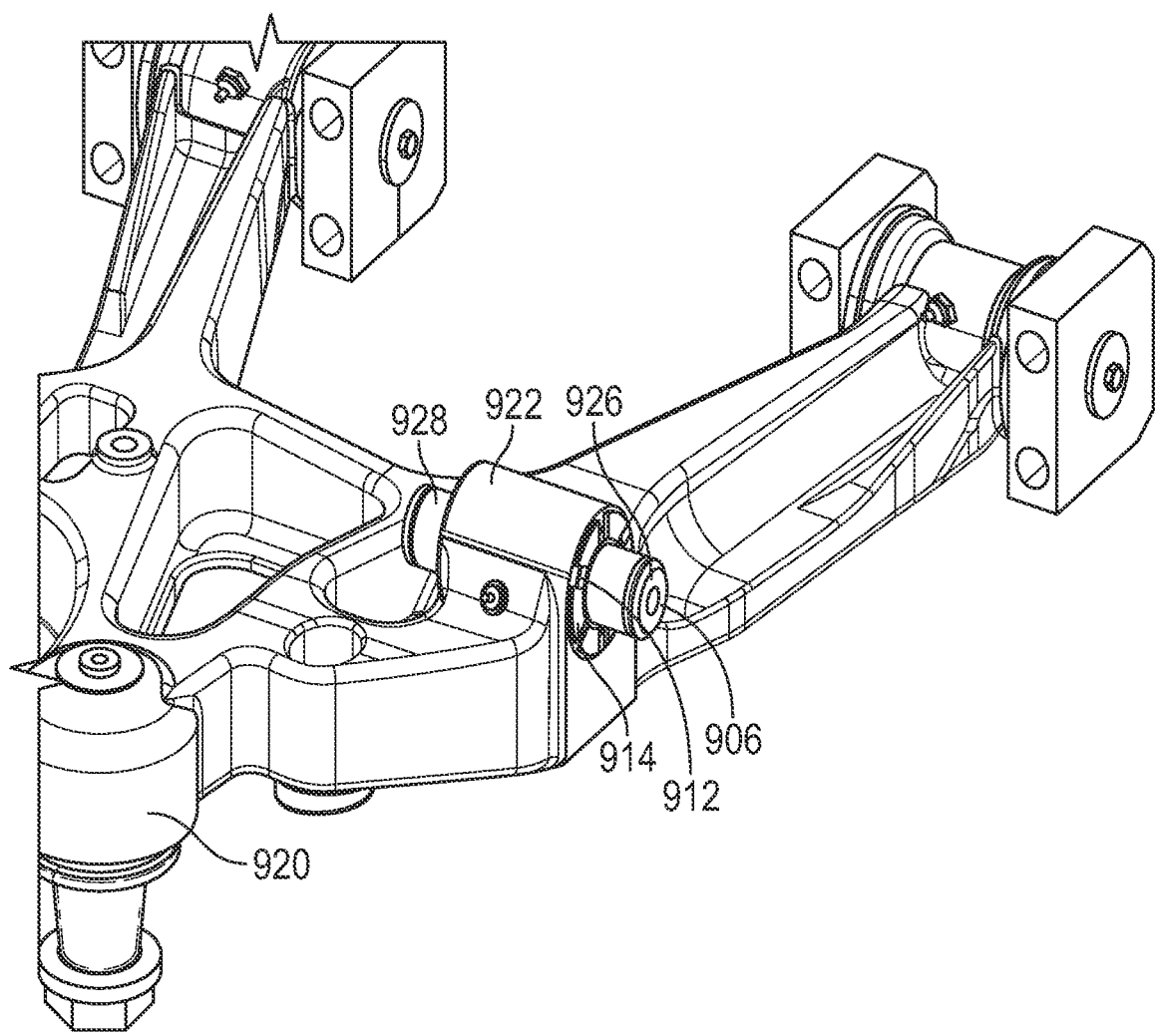
FIG. 10C is an elevated view of the mounting structure of FIG. 10A.

As shown in FIG. 10C, when the mounting pin 906 is inserted into the passage 924 of the mounting portion 922 and centered, first and second ends 926 and 928 of the mounting pin 906 protrude from the combination of the mounting portion 922, seals 912, and thrust washers 914. The first and second ends 926 and 928 provide connection points for the ears 902 and 904 of the eyelet 820.

Figure 10D:
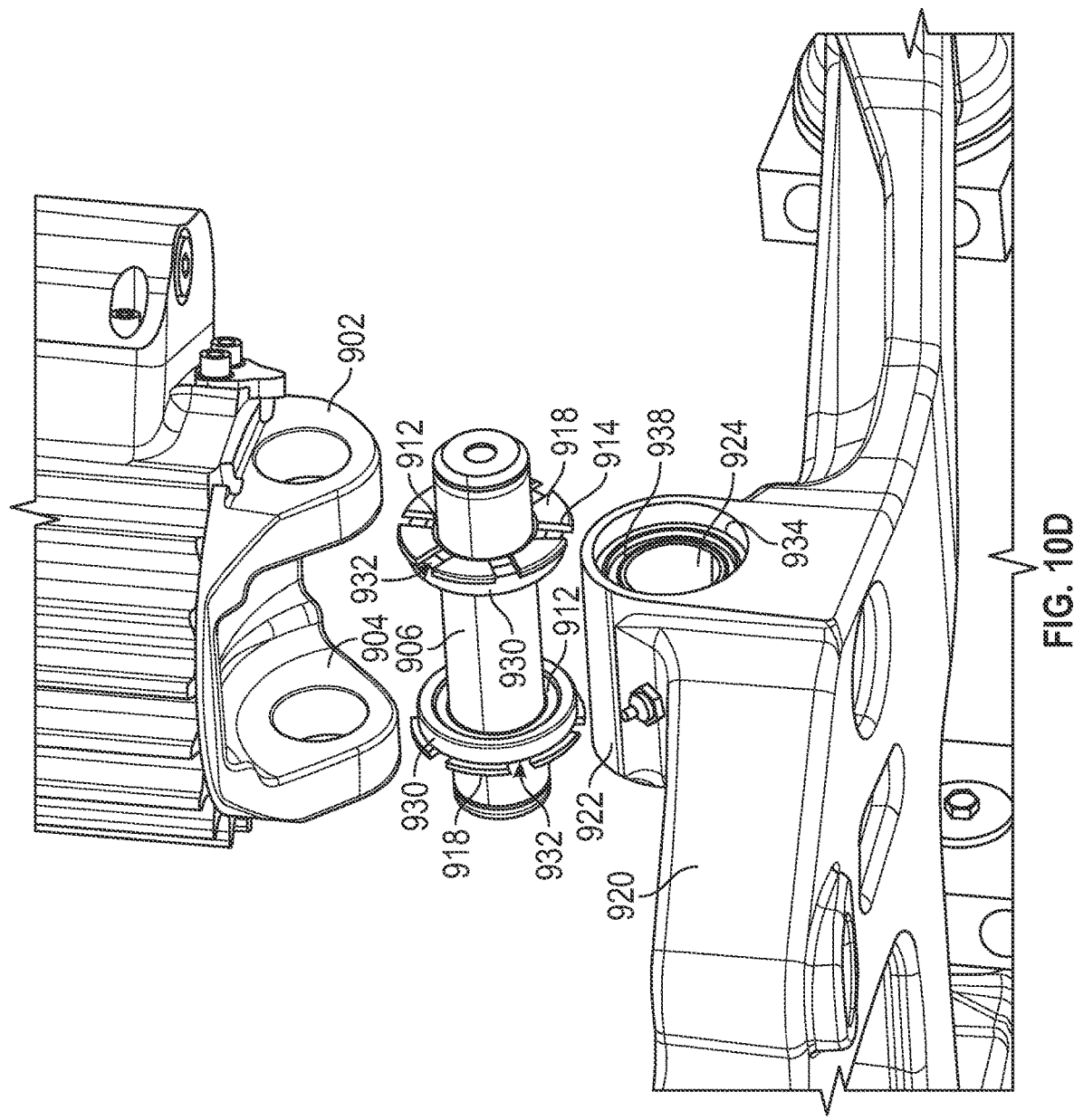
FIG. 10D is a lower view of the suspension element and mounting structure of FIG. 10A.
Figure 10E:
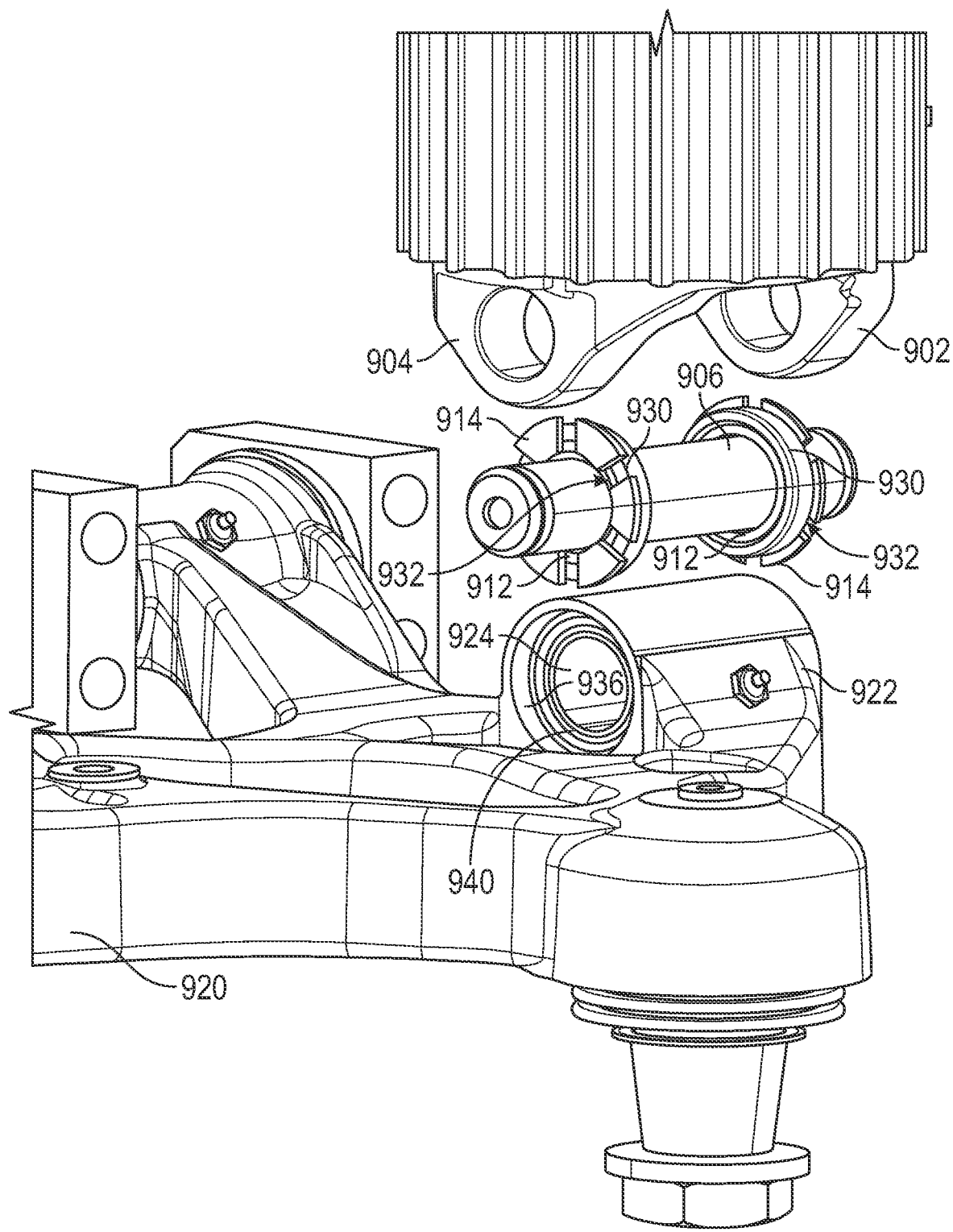
FIG. 10E is a side view of the suspension element and mounting structure of FIG. 10A.
Figure 10F:
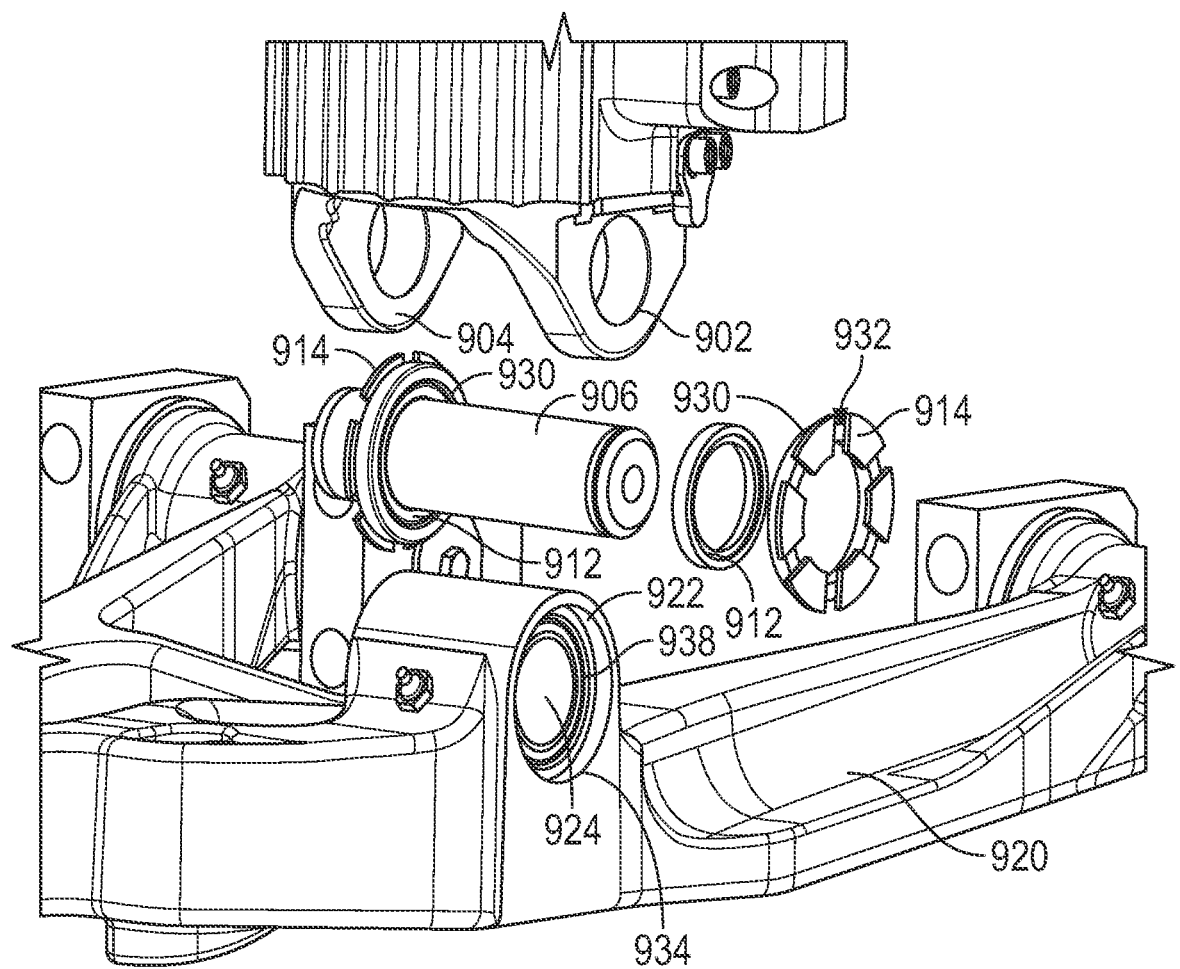
FIG. 10F is an exploded view of the mounting structure of FIG. 10A.

As shown in FIGS. 10D-10F, each thrust washer 914 includes an outer surface 918 and an inner ring 930. In one embodiment, there is a difference between the diameter of the inner ring 930 and the diameter of the mounting pin 906 to form an annular gap between the inner rings 930 and the mounting pin 906. In one embodiment, the seals 912 are disposed in these annular gaps. An outer surface of the seal 912 may be approximately flush with an inner surface (e.g., opposite the outer surface 918 proximal the lower support arm 920) of the thrust washer 914. Such a configuration facilitates the insertion of the combination of the thrust washers 914 and seals 912 into the mounting portion 922 of the support arm 920. Additionally, the outer surfaces 918 may include a plurality of channels 932 therein. Portions of the seals 912 may be visible when viewing the outer surfaces 918 of the thrust washers 914. The channels 932 facilitate the cleaning of the thrust washers 914 by providing a conduit through which debris can be removed (e.g., manually, fall out of, automatically, etc.) from the thrust washers 914. Since more debris will tend flow through the channels 932, the debris will not remain on the surface of the thrust washers 914 and harden.

In the embodiment shown, the mounting portion 922 includes a first substantially cylindrical passage 924. The mounting portion also includes a second substantially cylindrical passage 934 on a first side of the passage 924 and a third substantially cylindrical passage 936 on a second side of the passage 924. In one embodiment, the first passage 924, the second passage 934, and the third passage 936 are concentric. The first passage 924 is of a first diameter and the second and third passages 934 and 936 are of a second diameter that is greater than the first diameter. In one embodiment, the first passage 924 is centered within the mounting portion 922 such that the second and third passages 934 and 936 are of a similar dimension in the lengthwise direction of the mounting portion 922.

In one embodiment, the diameter of the first passage 924 is at least equal to the diameter of the mounting pin 906. The diameters of the second and third passages 934 and 936 are at least equal to the diameter of the inner rings 930 of the thrust washers 914. In one embodiment, the combinations of the thrust washers 914 and seals 912 are inserted into the passages 934 and 936.

A first face 938 is disposed at the boundary between the first passage 924 and the second passage 934, and a second face 940 is disposed at the boundary between the first passage 924 and the third passage 936. Axes normal to the faces 938 and 940 point outward from the center of the mounting portion 922. In one embodiment, the faces 928 and 940 include a plurality of grooves that are structured to receive portions of the thrust washers 914 and seals 912. Debris may be prevented from entering the first passage 924 and interfering with the coupling between the mounting pin 906 and the mounting portion 922. In some embodiments, grooves in the faces 938 and 940 receive portions of the fasteners 916 to secure the combinations of the seals 912 and thrusting washers 914 to the mounting portion 922.

Figure 10H:
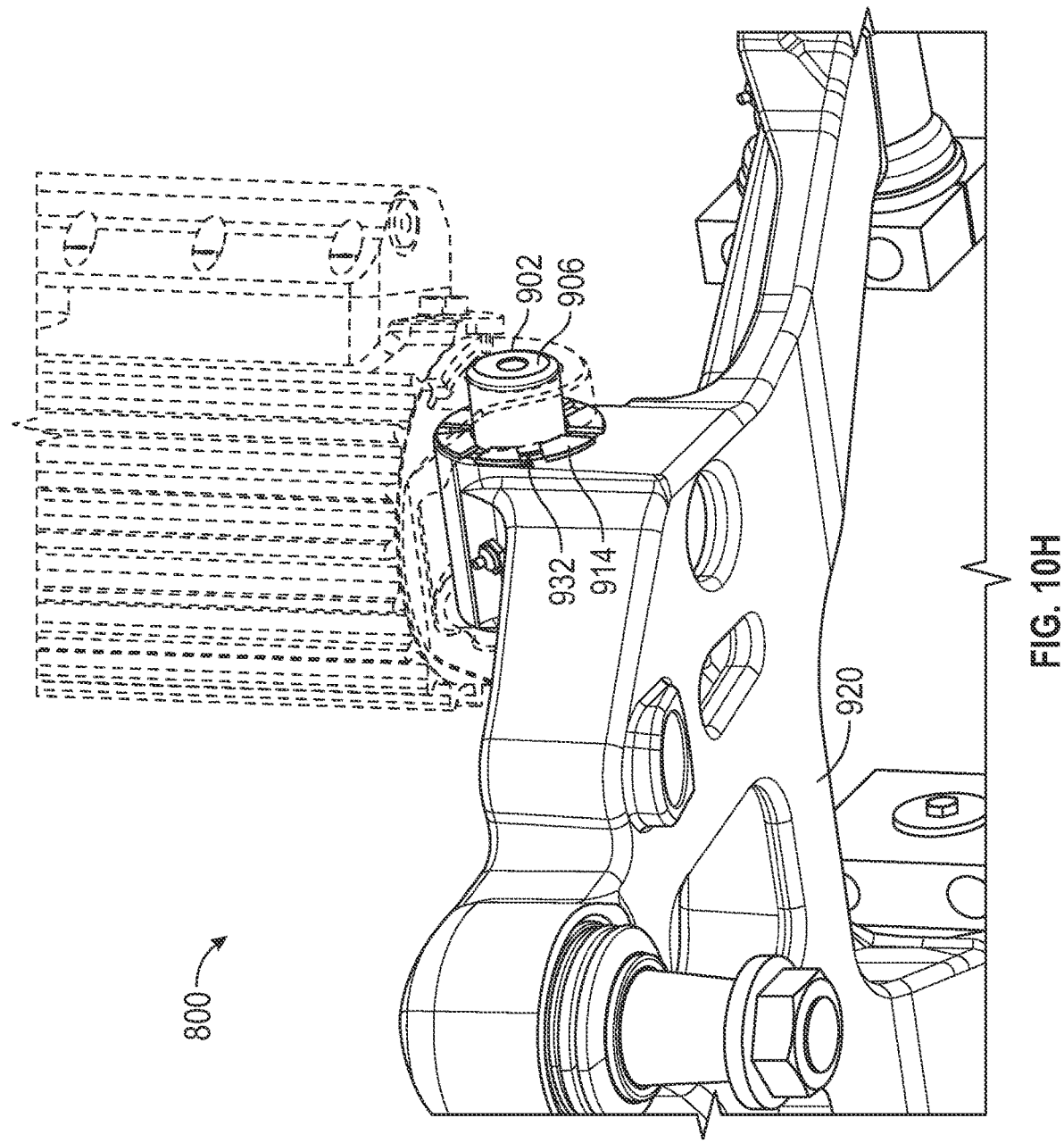
FIG. 10H is a lower view of the mounting structure of FIG. 10A.
Figure 10I:
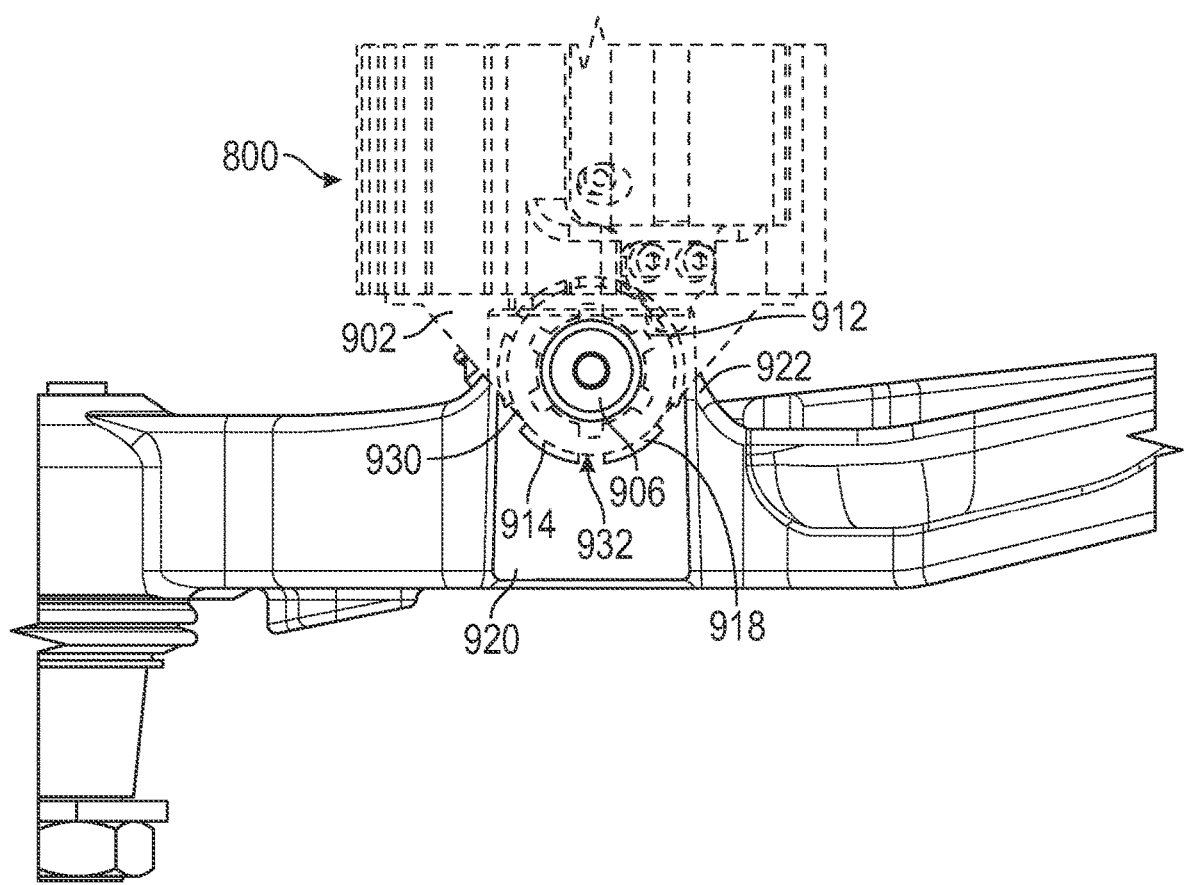
FIG. 10I is a side view of the mounting structure of FIG. 10A.

As shown in FIGS. 10G-10I, with the integrated spring damper 800 coupled to the mounting portion 922, surfaces of the ears 902 and 904 are approximately flush with the outer surfaces 918 of the thrust washers 914. Portions of the outer surfaces 918 of the thrust washers 914 extend outwardly from the ears 902 and 904 of the eyelet 820, such that portions of the outer surfaces 918 are at a larger radial position than the ears 902 and 904. Additionally, the inner rings 930 are substantially aligned with surfaces of the ears 902 and 904. As a result, openings are formed at the channels 932 of the outer surfaces 918. However, because the seals 912 fit in the gap between the inner rings 930 and the mounting pin 906, passage of debris through these openings is reduced (e.g., eliminated, etc.). Instead, the channels guide the debris outwardly, away from the connection points between the mounting pin 906 and the ears 902 and 904.

Figure 11A:
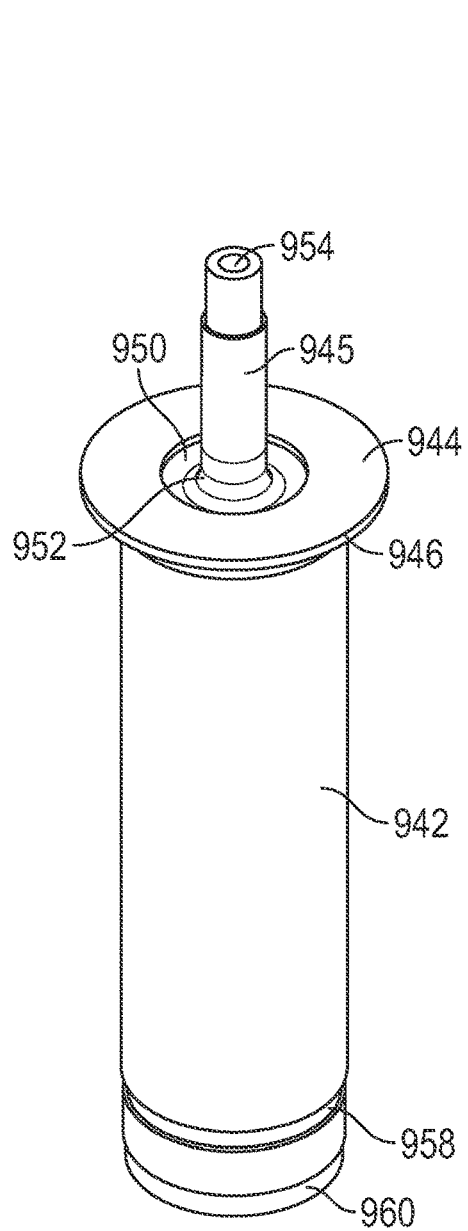
FIG. 11A is a side view of a main tube and cap of a suspension element, according to an exemplary embodiment.
Figure 11B:
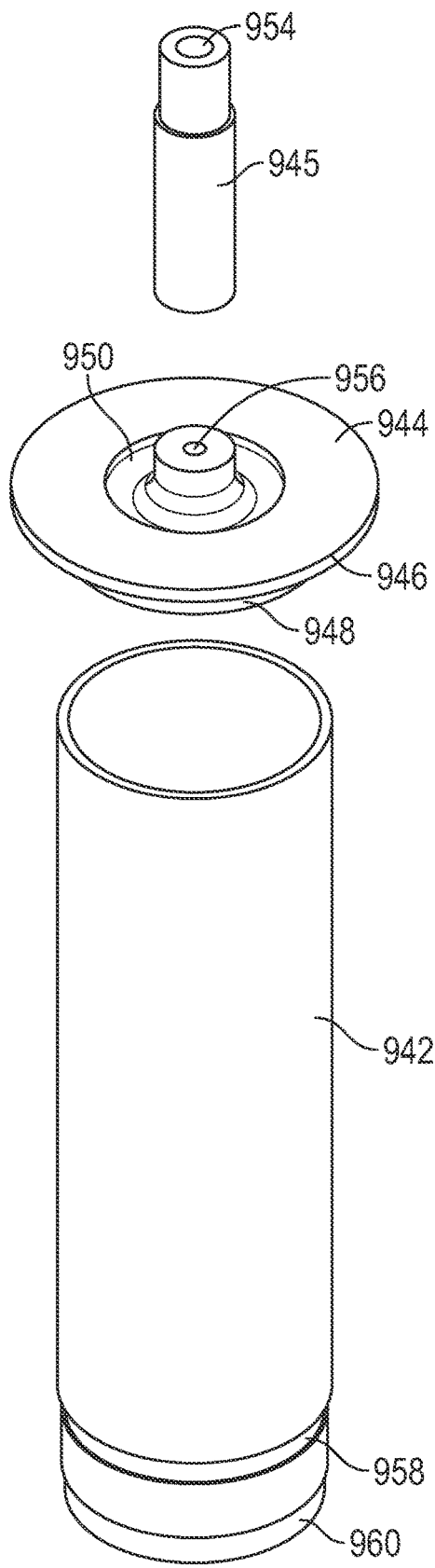
FIG. 11B is an exploded view of the main tube and cap of the suspension element of FIG. 11A.

Referring now to FIGS. 11A-11B, isometric views of a main tube, shown as main tube 942, and a cap, shown as cap 944, are shown in accordance with an example embodiment. In various embodiments, the main tube 942 may be equivalent to the main tube 816 discussed above. The cap 944 may be an alternative to the cap 818 discussed above.

The cap 944 is affixed to a first end of the main tube 942. The cap 944 includes an upper face 946 and a lower portion 948 that extends downward from the upper face 946. In one embodiment, both the upper face 946 and the lower portion 948 are substantially circular. The diameter of the upper face 946 may be greater than the diameter of the lower portion 948. In one embodiment, the diameter of the lower portion 948 is at most equal to an inner diameter of the main tube 942, and the lower portion 948 may be coupled to an inner surface of the main tube 942 (e.g., with a threaded connection, etc.). In one embodiment, the diameter of the lower portion 948 is greater than an outer diameter of the main tube 942, and the main tube 942 may be inserted into the lower portion 948.

In the embodiment shown, an annular groove 950 is formed proximate to the center of the cap 944. Portions of an upper mount used to secure an integrated spring damper to a vehicle may be inserted into the annular groove 950. A substantially cylindrical protruding portion 945 extends from the center of the upper face 946. In one embodiment, a friction weld 952 is formed between the protruding portion 945 and a central portion of the upper face 946. An opening 954 extends through the protruding portion 945. In one embodiment, an additional opening 956 extends through a central portion of the cap 944 to fluidly couple the protruding portion 945 to the inner volume of the main tube 942 (e.g., to form a pressure regulator for an integrated spring damper). In one embodiment, the opening 954 is greater in diameter than the opening 956 to increase the pressure of fluid being inserted into the main tube 942.

In the embodiment shown, the main tube 942 includes a first notch 958 and a second notch 960 spaced from the first notch 958. In one embodiment, the second notch 960 is disposed at an end of the main tube 942 that is opposite to the cap 944. The spacing between the first notch 958 and the second notch 960 may correspond to the distance between portions of a main piston (e.g., the main piston 824) of an integrated spring damper. The notches 958 and 960 facilitate the coupling of the main piston to the main tube 942 such that forces applied to the main tube 942 cause the positioning of the main piston to shift to provide the springing and damping forces discussed above.

Figure 12:
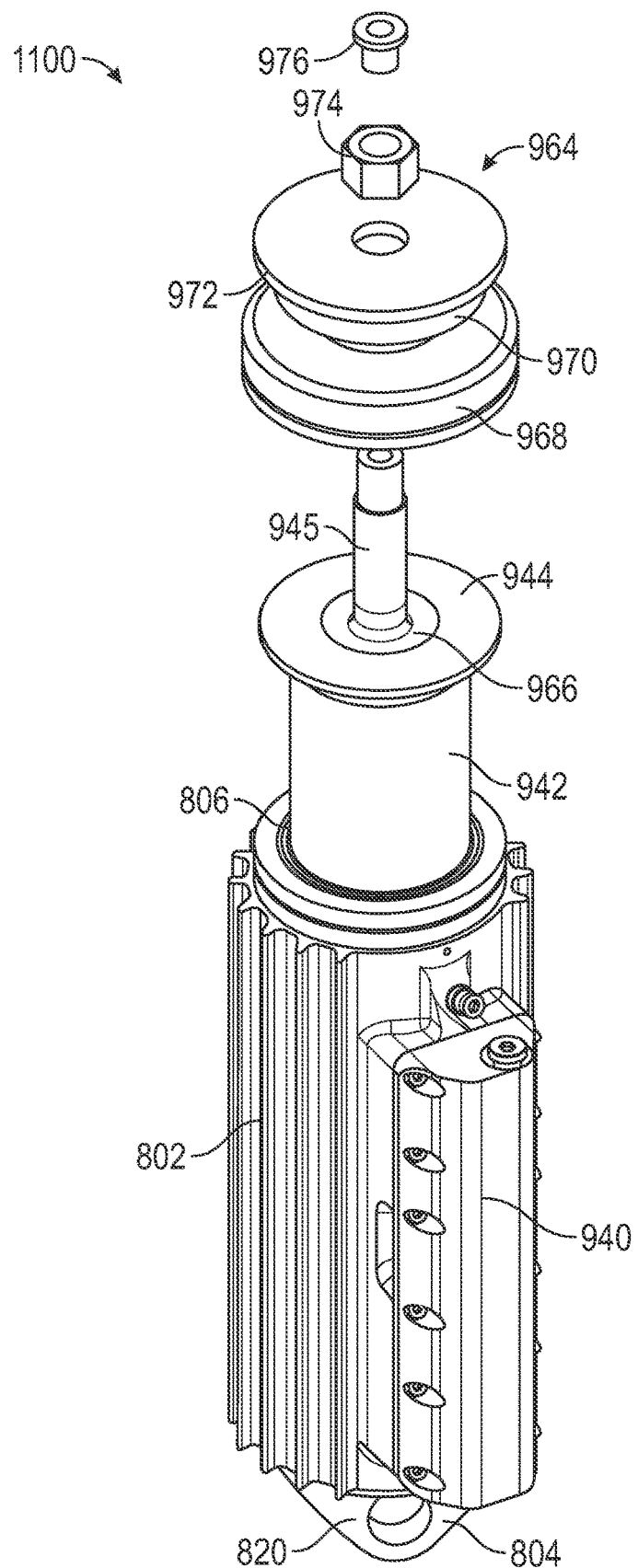
FIG. 12 is a side view of a suspension element and an upper mount, according to an exemplary embodiment.

Referring now to FIG. 12, a view of an integrated spring damper 1100 is shown, according to an exemplary embodiment. The integrated spring damper 1100 includes a main body, shown as main body 802, and a main tube, shown as main tube 942. The main body 802 is tubular. In one embodiment, the main body 802 is manufactured using an extrusion process. In an alternative embodiment, the main body 802 is manufactured using a casting process. As shown in FIG. 12, a cap, shown as cap 804, and a barrier, shown as barrier 806, are disposed on opposing ends of the main body 802, defining an internal volume. The main tube 942 is at least partially received within the internal volume of the main body 802. The main tube 942 is configured to translate with respect to the main body 802. A cap, shown as cap 944, is disposed at a distal end of the main tube 942. The cap 804, barrier 806, and cap 944 may be coupled to the respective components with a threaded connection or with another coupling mechanism (e.g., welding, a friction weld, brazing, interference fit, etc.).

According to an exemplary embodiment, the integrated spring damper 1100 includes a first mounting portion (e.g., a lower mounting portion, etc.), shown as eyelet 820, with which the integrated spring damper 1100 is coupled to one portion of an axle assembly (e.g., a lower portion of the axle assembly, etc.). According to an exemplary embodiment, the integrated spring damper 800 is coupled on one end (e.g., with the eyelet 820 on a lower end, etc.) to a moveable member of the axle assembly (e.g., a lower support arm, etc.). According to an exemplary embodiment, the eyelet 820 is integrally formed with the cap 804. In one embodiment, the eyelet 820 is coupled to a mounting portion (e.g., the mounting portion 922) of a lower support arm (e.g., the lower support arm 920) using a mounting pin (e.g., the mounting pin 906) discussed above.

As shown in FIG. 12, the integrated spring damper 1100 includes a second mounting portion (e.g., an upper mounting portion, a pin mount, etc.), shown as upper mount 964. The upper mount 964 is configured to couple an opposing second end (e.g., an upper end, etc.) of the integrated spring damper 1100 to a vehicle body, frame member, or part thereof.

In the embodiment shown, the upper mount 964 includes a first mounting member 966 that is disposed proximal the cap 944. As shown in FIG. 12, the first mounting member 966 is inserted in an annular grove (e.g., the annular groove 950) in the cap 944. The first mounting member 966 is substantially annular in shape and includes an opening through which a portion of the cap 844 extends. In one embodiment, the first mounting member 966 is a resilient member, such as a flexible urethane, and serves as an isolator and an elastomeric spacer. In one embodiment, the upper surface of the first mounting member 966 is substantially flush with an upper surface of a cap 944. In alternative embodiments, the first mounting member 966 extends above the upper surface of the cap 944. The upper mount 964 further includes a second mounting member 968 disposed proximal the first mounting member 966. In one embodiment, the second mounting member 968 may define a volume into which the cap 944 is disposed. With the upper mount 964 disposed on the cap 944, the cap 944 is substantially covered by the second mounting member 968. In one embodiment, the second mounting member 968 is constructed of a metal or another wear resistant material. In one embodiment, the first mounting member 966 isolates the second mounting member 968 from the cap 944. The first mounting member 966 may be friction welded to the second mounting member 968. In one embodiment, the upper surface of the second mounting member 968 is structured to abut the surface of a structure (e.g., chassis, side plate, hull, etc.) of a vehicle.

The upper mount 964 further includes a third mounting member 970. The third mounting member 970 may be spaced from the second mounting member 968 to provide space for a vehicle structure. The vehicle structure may be mounted between the second portion 968 and the third mounting member 970, such that a lower surface of the third mounting member abuts the vehicle structure. In one embodiment, the third mounting member 970 is a resilient member, such as a flexible urethane, and serves as an isolator and an elastomeric spacer. The upper mount 964 further includes a fourth mounting member 972 disposed proximal the third mounting member 970. The lower surface of the fourth mounting member 972 contacts the upper surface of the third mounting member 970. In one embodiment, the fourth mounting member 972 is constructed from a metal or another wear resistant material. In one embodiment, the fourth mounting member 972 is friction welded to the third mounting member 970.

In some embodiments, the first or second mounting members 966 and 968 include portions that extend through an opening in the vehicle structure (e.g., a side wall) to which the integrated spring damper 1100 is to be mounted to engage with the third or fourth mounting members 970 and 972.

In the embodiment shown, each of the mounting members 966-972 is substantially annular and include openings at approximately the centers thereof. In one embodiment, each of the openings receive the protruding portion 945 of the cap 944. In one embodiment, the protruding portion 945 of the cap 944 extends above the uppermost surface of the fourth mounting member 972 when the upper mount 964 is disposed on the cap 944. In one embodiment, an outer surface of the protruding portion 945 is threaded such that a fastener 974 may be tightened to secure the upper mount 964, and thereby the integrated spring damper 1100, to a structure of a vehicle.

In one embodiment, a pressure regulation portion 976 may is coupled to the fastener 974. The pressure regulation portion 976 may be coupled to the openings in the protruding portion 845 of the cap to provide a pressure regulation line for the integrated spring damper 1100. With the pressure regulation portion 976, compressible fluid may be introduced into an internal volume of the main tube 942 to adjust the riding height of the integrated spring damper 1100.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:
   a support arm having a mounting portion including a passage;
   a suspension element including a cap attached to a first end of the suspension element, the cap including a first opening;
   a thrust washer disposed between the passage and the first opening, the thrust washer including a ring, the thrust washer defining a plurality of channels that extend in a radial direction with respect to a central axis of the ring; and
   a mounting pin extending through the passage, the first opening, and the thrust washer, wherein the mounting pin rotatably couples the suspension element to the support arm.

2. The vehicle of claim 1, wherein the ring is spaced apart from the mounting pin to form an annular gap therebetween, wherein the vehicle further comprises a seal that is at least partially disposed within the annular gap.

3. The vehicle of claim 2, wherein the seal occludes the annular gap.

4. The vehicle of claim 1, wherein the cap further comprises an ear, wherein the first opening is defined by the ear, and wherein the ear is spaced apart from the support arm by the thrust washer.

5. The vehicle of claim 1, wherein the plurality of channels are disposed at an axial end of the ring.

6. The vehicle of claim 1, wherein the support arm defines a recessed area at an end of the passage, wherein the ring is received at least partially within the recessed area, and wherein at least one of the plurality of channels extends radially outwardly from the recessed area.

7. The vehicle of claim 1, wherein an inner diameter of the ring is greater than an inner diameter of at least one of the plurality of channels.

8. The vehicle of claim 1, wherein at least one of the plurality of channels extends radially beyond the first opening.

9. The vehicle of claim 1, wherein the plurality of channels are spaced in approximately equal intervals along a perimeter of the ring.

10. The vehicle of claim 1, wherein the ring is disposed at an intermediate radial position between an outer diameter and an inner diameter of at least one of the plurality of channels.

11. The vehicle of claim 1, where an axial length of the ring is greater than an axial length of the plurality of channels.

\* \* \* \* \*